(12) United States Patent
Takizawa et al.

(10) Patent No.: US 11,897,342 B2
(45) Date of Patent: Feb. 13, 2024

(54) ELECTRONIC CONTROL APPARATUS

(71) Applicant: DENSO CORPORATION, Kariya (JP)

(72) Inventors: Tomohiro Takizawa, Kariya (JP);
Akira Sumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 143 days.

(21) Appl. No.: 17/705,883

(22) Filed: Mar. 28, 2022

(65) Prior Publication Data
US 2022/0219543 A1   Jul. 14, 2022

Related U.S. Application Data

(63) Continuation of application No. PCT/JP2020/036483, filed on Sep. 25, 2020.

(30) Foreign Application Priority Data

Sep. 27, 2019 (JP) .................................. 2019-176630

(51) Int. Cl.
*B60L 3/00* (2019.01)
*B60R 16/033* (2006.01)

(52) U.S. Cl.
CPC .......... *B60L 3/0046* (2013.01); *B60R 16/033* (2013.01); *B60L 2240/547* (2013.01)

(58) Field of Classification Search
CPC .. B60L 3/0046; B60L 2240/547; B60L 58/22; B60R 16/033; H01H 9/54; H02J 7/02
See application file for complete search history.

(56) References Cited

U.S. PATENT DOCUMENTS

| | | | |
|---|---|---|---|
| 2009/0033282 A1 | 2/2009 | Ishikawa et al. | |
| 2010/0222955 A1* | 9/2010 | Chevalier ........... | B60R 16/0231 |
| | | | 701/31.4 |
| 2017/0146118 A1 | 5/2017 | Okubo et al. | |

(Continued)

FOREIGN PATENT DOCUMENTS

| | | |
|---|---|---|
| JP | 2015-58885 A | 3/2015 |
| JP | 2015-211557 A | 11/2015 |
| JP | 2019-004682 A | 1/2019 |

OTHER PUBLICATIONS

Dec. 15, 2020 Search Report issued in International Patent Application No. PCT/JP2020/036483.

*Primary Examiner* — Jeffrey M Shin
(74) *Attorney, Agent, or Firm* — Oliff PLC

(57) ABSTRACT

An electronic control apparatus includes a first controller that is activated upon being fed with electric power through a first electric power feeding path, and a second controller that is fed with electric power through a second electric power feeding path. In the first electric power feeding path, there is provided a power supply switch that is turned on when a switch command is a connection command and turned off when the switch command is a cutoff command. The first controller transmits a state signal indicating whether it is in an activated state or a stopped state. The second controller diagnoses the power supply switch as being abnormal on condition that the state signal indicates the stopped state of the first controller when the switch command is the connection command or the state signal indicates the activated state of the first controller when the switch command is the cutoff command.

28 Claims, 14 Drawing Sheets

(56) References Cited

U.S. PATENT DOCUMENTS

| | | | |
|---|---|---|---|
| 2017/0237128 A1* | 8/2017 | Kubo | H02J 7/0029 |
| | | | 429/7 |
| 2019/0144028 A1 | 5/2019 | Taki et al. | |
| 2019/0144029 A1 | 5/2019 | Taki et al. | |
| 2019/0144030 A1 | 5/2019 | Sakai et al. | |
| 2019/0322178 A1* | 10/2019 | Sturza | B60L 3/0069 |

* cited by examiner

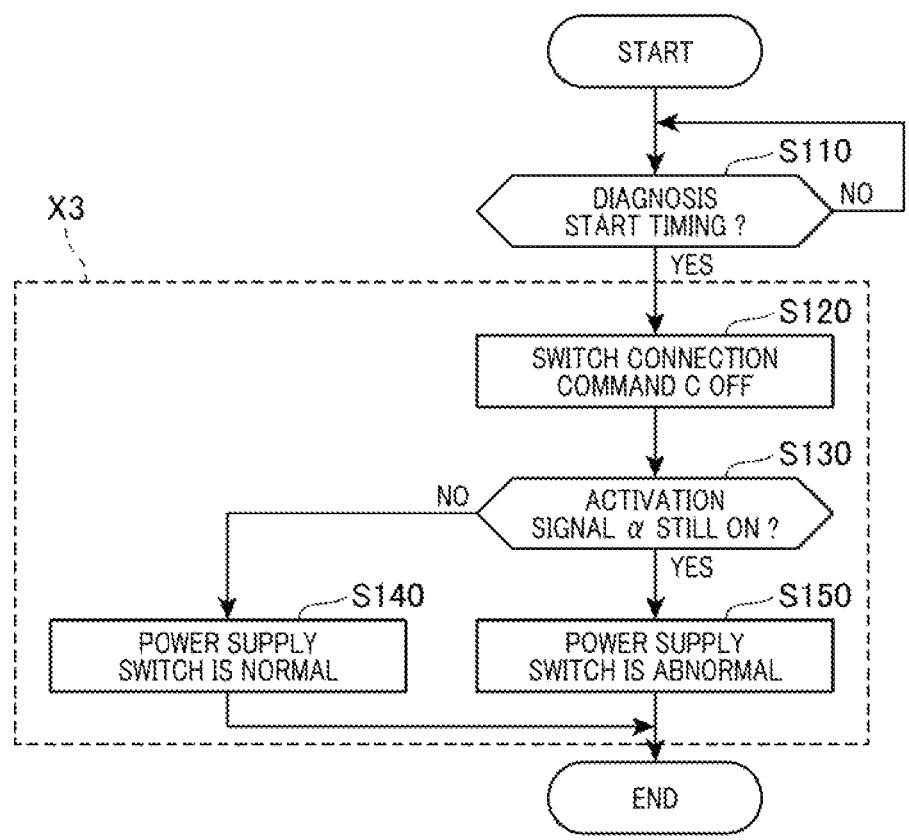

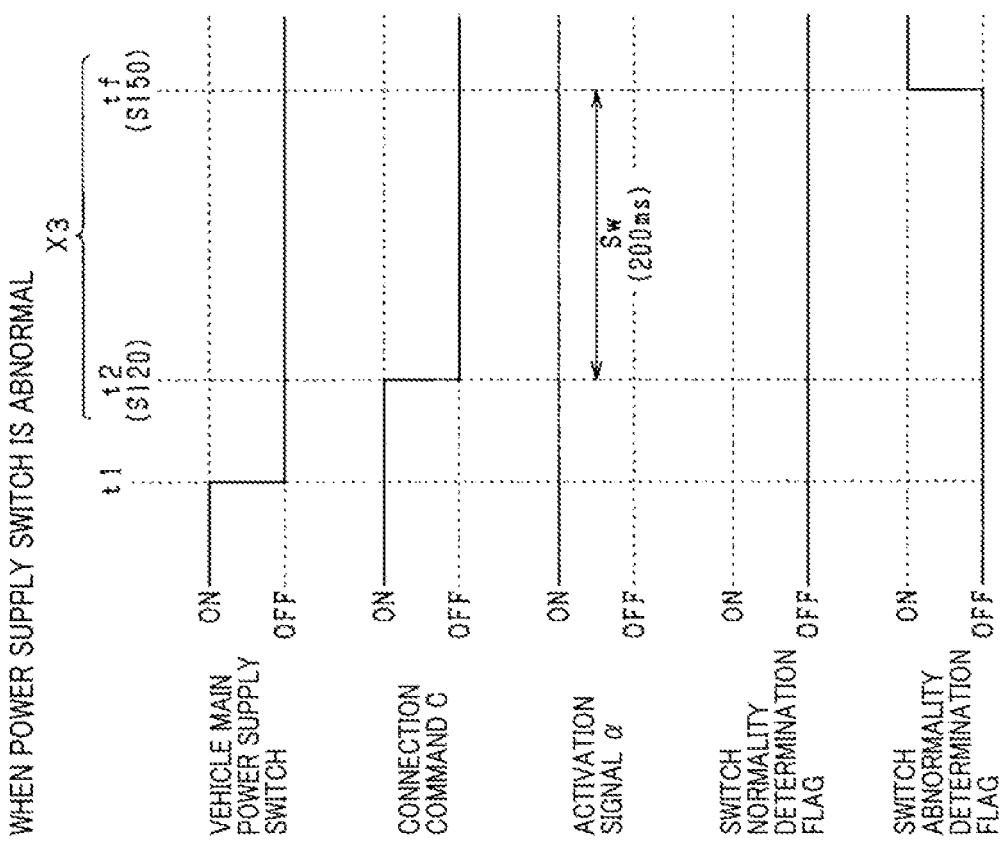
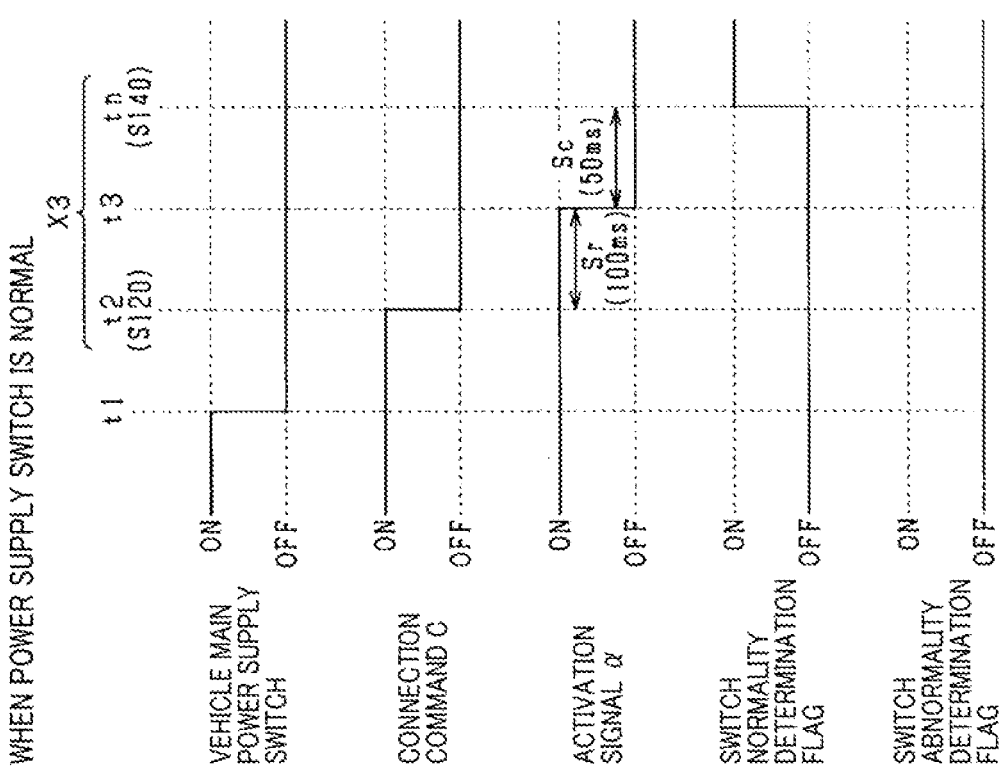

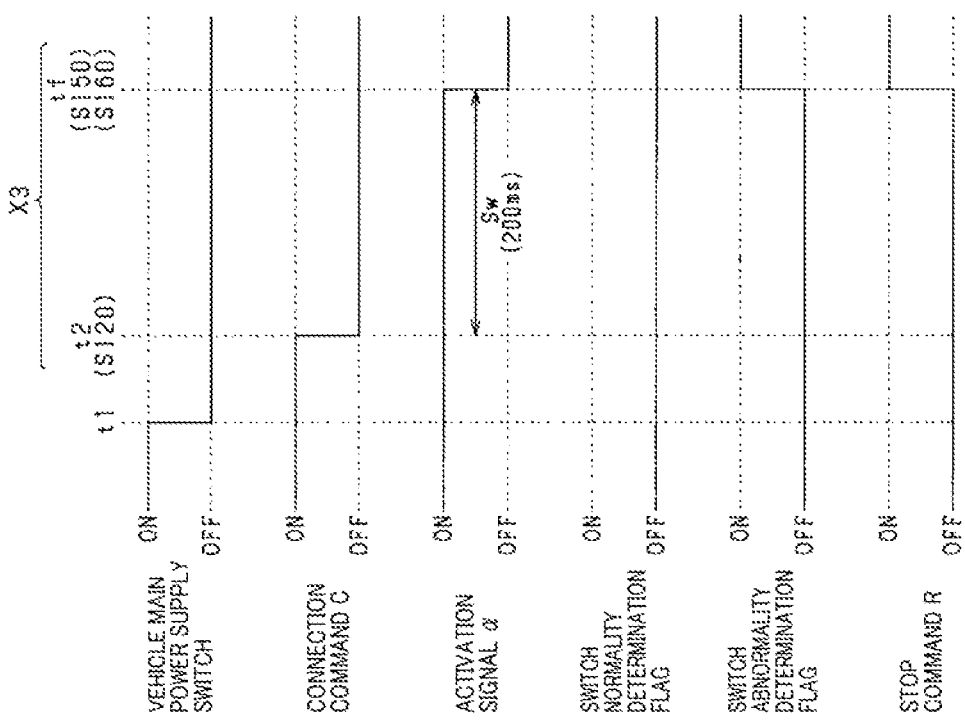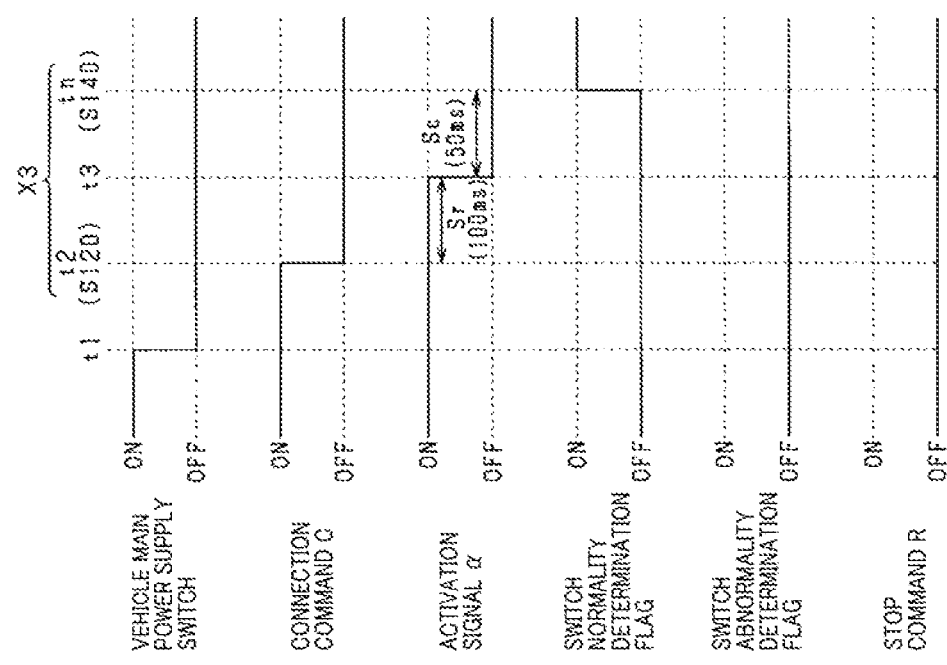

FIG.8

WHEN ACTIVATION SIGNAL OR STOP FUNCTION IS ABNORMAL

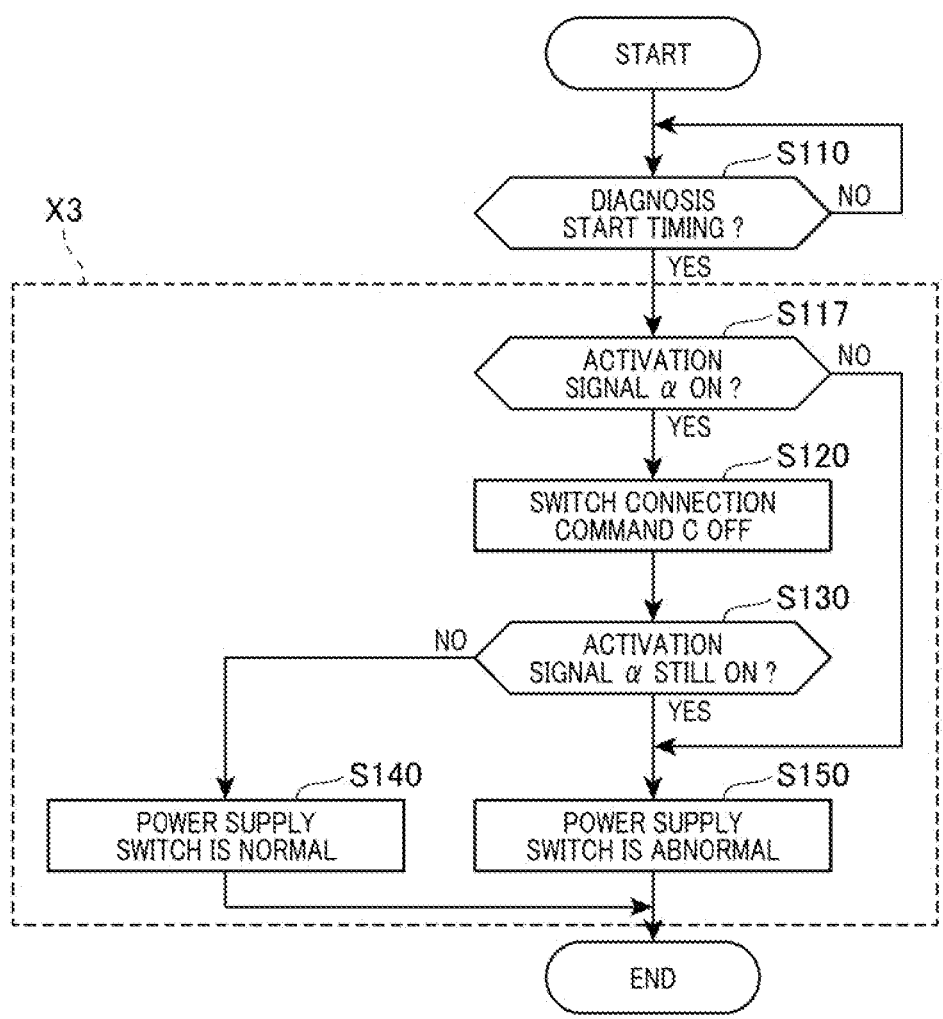

ELECTRONIC CONTROL APPARATUS

CROSS-REFERENCE TO RELATED APPLICATIONS

The present application is a continuation application of International Application No. PCT/JP2020/036483 filed on Sep. 25, 2020, which is based on and claims priority from Japanese Patent Application No. 2019-176630 filed on Sep. 27, 2019. The entire contents of these applications are incorporated by reference into the present application.

BACKGROUND

1 Technical Field

The present disclosure relates to vehicular electronic control apparatuses that control electrical machines and devices installed in vehicles.

2 Description of Related Art

A vehicle is generally equipped with various electrical machines and devices and various electronic control apparatuses (or ECUs) for controlling the electrical machines and devices. Moreover, some of the electronic control apparatuses, such as the one disclosed in Japanese Patent Application Publication No. JP 2019-004682 A, are configured to include a plurality of microcomputers.

SUMMARY

For some vehicular electronic control apparatuses, such as a battery ECU that constitutes a part of a battery monitoring system, even in a main power supply OFF state where a main power supply switch of the vehicle is kept OFF, it is preferable to keep them activated (or sleeping) in a power-saving mode or the like without completely stopping the activation thereof, so as to allow them to operate as needed. However, in the case of keeping the electronic control apparatuses in a sleep state without completely stopping the activation thereof even in the main power supply OFF state, the dark current consumed by the vehicle would be increased.

To solve the above problem, the following measure may be taken. That is, an electronic control apparatus may include both a first controller configured with a main microcomputer and a second controller configured with a sub-microcomputer. Further, a power supply switch may be provided in the first controller. In the main power supply OFF state, the power supply switch of the first controller may be kept OFF while the second controller is kept in a sleep state. Moreover, the second controller may wake, in response to a signal or the like from outside of the electronic control apparatus, from the sleep state to turn on the power supply switch of the first controller.

However, with the above configuration, upon occurrence of a stuck-OFF fault in the power supply switch of the first controller, the first controller cannot be fed with electric power in a main power supply ON state where the main power supply switch of the vehicle is kept ON. On the other hand, upon occurrence of a stuck-ON fault in the power supply switch of the first controller, in the main power supply OFF state, the first controller, whose activation should be stopped, will be kept activated (or sleeping). Consequently, the dark current will continue to flow through the first controller; thus the battery may run out.

The present disclosure has been accomplished in view of the above circumstances.

According to the present disclosure, there is provided an electronic control apparatus which includes a first controller and a second controller. The first controller is provided for controlling a predetermined electronic device installed in a vehicle. The first controller is configured to be activated, upon being fed with electric power through a first electric power feeding path, and thus brought into an activated state. The second controller is configured to be fed with electric power through a second electric power feeding path that is different from the first electric power feeding path. In the first electric power feeding path, there is provided a power supply switch. The power supply switch is configured to: be turned on, when a predetermined switch command for the power supply switch is a connection command, and thereby enable the first electric power feeding path to transmit electric power; and be turned off, when the switch command is a cutoff command (or disconnection command), and thereby disable the first electric power feeding path from transmitting electric power. The first controller is further configured to transmit a state signal indicating whether the first controller is in the activated state or a stopped state where the activation thereof is stopped (or a deactivated state where the first controller is deactivated). The second controller is further configured to perform at least one of a stuck-OFF diagnosis and a stuck-ON diagnosis for the power supply switch. In the stuck-OFF diagnosis, the second controller diagnoses, on condition that the state signal indicates the stopped state of the first controller when the switch command is the connection command, the power supply switch as being abnormal. In the stuck-ON diagnosis, the second controller diagnoses, on condition that the state signal indicates the activated state of the first controller when the switch command is the cutoff command, the power supply switch as being abnormal.

In the above electronic control apparatus, when the state signal indicates the stopped state of the first controller even though the switch command is the connection command, it is highly probable that the power supply switch has the stuck-OFF fault. Moreover, when the state signal indicates the activated state of the first controller even though the switch command is the cutoff command, it is highly probable that the power supply switch has the stuck-ON fault. In view of the above, the second controller diagnoses the power supply switch as being abnormal on condition that the state signal indicates the stopped state of the first controller when the switch command is the connection command or the state signal indicates the activated state of the first controller when the switch command is the cutoff command. Consequently, it becomes possible to detect an abnormality of the power supply switch using the switch command and the state signal. As a result, it becomes possible to handle the abnormality of the power supply switch by, for example, notifying the vehicle driver of the abnormality of the power supply switch, feeding electric power to the first controller through an electric power feeding path other than the first electric power feeding path, or cutting off the first electric power feeding path by a cutting-off means other than the power supply switch.

BRIEF DESCRIPTION OF THE DRAWINGS

FIG. 2 is a flow chart illustrating a power supply control performed by a second controller of the electronic control apparatus according to the first embodiment.

FIGS. 3A and 3B are timing charts illustrating the power supply control performed by the second controller of the electronic control apparatus according to the first embodiment.

FIGS. 6A and 6B are timing charts illustrating the power supply control performed by the second controller of the electronic control apparatus according to the second embodiment.

FIG. 8 is a timing chart illustrating the power supply control performed by the second controller of the electronic control apparatus according to the third embodiment when an activation signal has a stuck-ON fault.

FIG. 15 is a flow chart illustrating a power supply control performed by a second controller of an electronic control apparatus according to a sixth embodiment.

DESCRIPTION OF EMBODIMENTS

Figure 1:
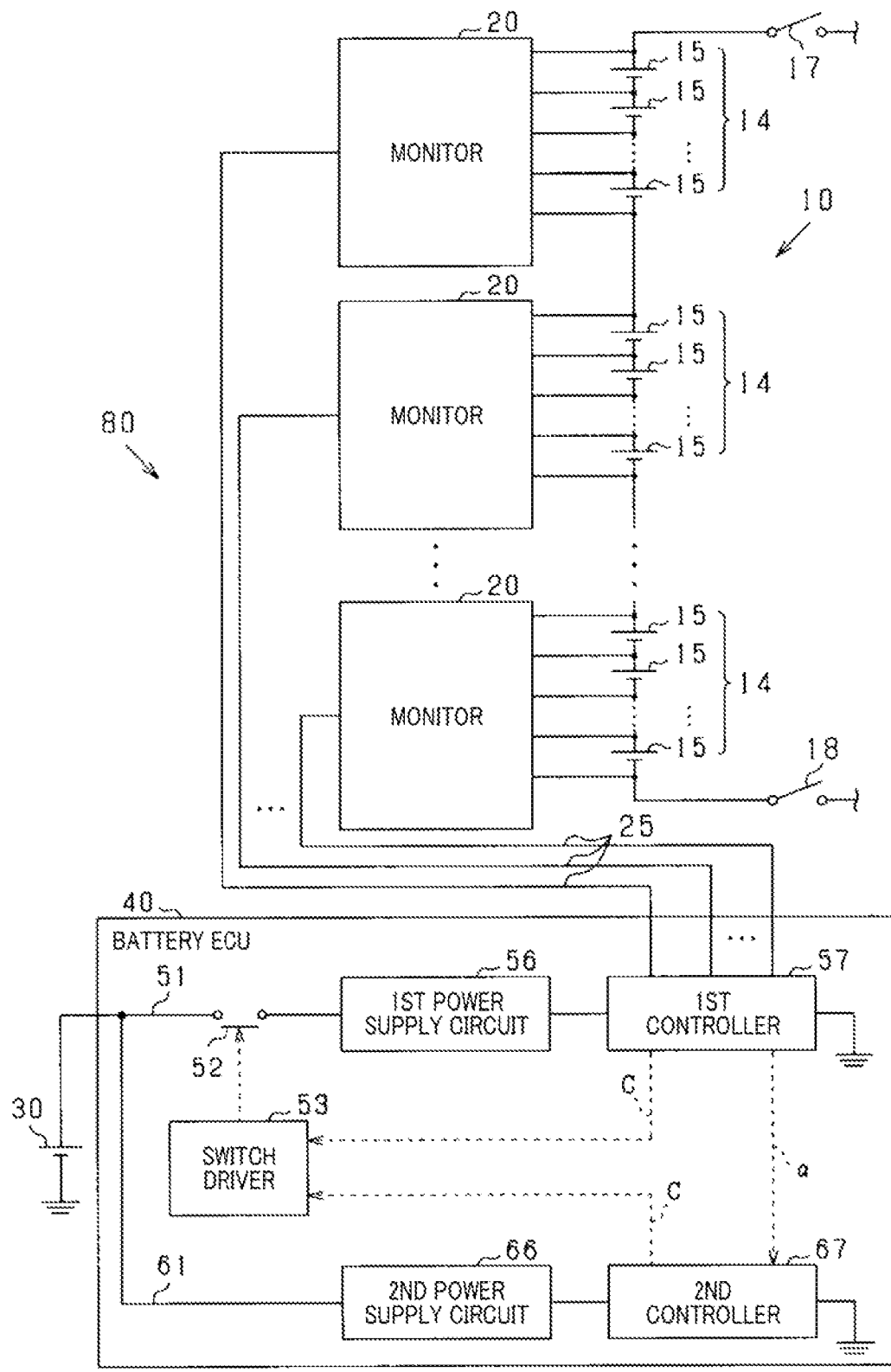
FIG. 1 is a schematic circuit diagram illustrating the configuration of a battery monitoring system which includes an electronic control apparatus according to a first embodiment.

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, explanation of identical components will not be repeated.

First Embodiment

FIG. 1 illustrates an electric circuit formed in a vehicle. As shown in FIG. 1, in the vehicle, there are installed an assembled battery 10, an auxiliary battery 30 and a battery monitoring system 80 for monitoring the assembled battery 10.

The assembled battery 10 may be implemented by, for example, a lithium battery. The assembled battery 10 is constituted of a plurality of battery cells 15 that are connected in series with each other. Moreover, the battery cells 15 are divided into a plurality of groups which will be referred to as the "battery cell groups 14" hereinafter.

The assembled battery 10 is connected, via predetermined electric power feeding paths, to electrical loads such as an inverter of an electric motor. In the electric power feeding paths, there are provided contactors 17 and 18. When the contactors 17 and 18 are in an ON state, electric power can be fed from the assembled battery 10 to the electrical loads. In contrast, when the contactors 17 and 18 are in an OFF state, electric power cannot be fed from the assembled battery 10 to the electrical loads.

The battery monitoring system 80 includes a plurality of monitors 20 and a battery ECU (Electronic Control Unit) 40. The battery ECU 40 corresponds to the "electronic control apparatus" according to the present disclosure. Each of the monitors 20 is provided for a corresponding one of the battery cell groups 14. Specifically, each of the monitors 20 is connected, via electrical conductors, with both ends of the corresponding battery cell group 14 and all of junction points between the battery cells 15 of the corresponding battery cell group 14. Each of the monitors 20 detects the voltage of each of the battery cells 15 of the corresponding battery cell group 14. Moreover, each of the monitors 20 performs, in response to an equalization command transmitted from the battery ECU 40, an equalization process of equalizing the voltages of the battery cells 15 of the corresponding battery cell group 14.

The auxiliary battery 30 may be implemented by, for example, a lead-acid battery. The auxiliary battery 30 feeds electric power to the battery ECU 40 and the like.

The battery ECU 40 includes a first controller 57 and a second controller 67. The first controller 57 is fed with electric power from the auxiliary battery 30 through a first electric power feeding path 51. In the first electric power feeding path 51, there are provided both a power supply switch 52 and a first power supply circuit 56. The first power supply circuit 56 is configured to transform the voltage of, for example, about 12V supplied from the auxiliary battery 30 to a voltage of, for example, 5V.

The power supply switch 52 is controlled by a switch driver 53. Specifically, the switch driver 53 controls the power supply switch 52 based on a connection command C transmitted from the first controller 57 and the second controller 67.

More specifically, when the connection command C is in an ON state, the switch driver 53 turns on the power supply switch 52 and thereby connects the first electric power feeding path 51 so as to enable it to transmit electric power. On the other hand, when the connection command C is in an OFF state, the switch driver 53 turns off the power supply switch 52 and thereby cuts off the first electric power feeding path 51 so as to disable it from transmitting electric power. Accordingly, in the present embodiment, the connection command C being in the ON state indicates that a "switch command" for the power supply switch 52 is a "connection command"; and the connection command C being in the OFF state indicates that the "switch command" is a "cutoff command" (or "disconnection command").

In addition, for each of the above-described connection command C and other commands R and D and signals a and p which will be described later, the ON state of the command or signal is represented by the voltage level of the command or signal being a "High" level higher than a predetermined threshold; and the OFF state of the command or signal is represented by the voltage level of the command or signal being a "Low" level lower than a predetermined threshold.

The first controller 57 is implemented by a microcomputer. The first controller 57 is communicably connected with the monitors 20 via communication lines 25. Upon being fed with electric power through the first electric power feeding path 51, the first controller 57 is activated and thus brought into an activated state. In the activated state, the first controller 57 acquires cell voltage information, which is information on the voltages of the battery cells 15, from the monitors 20. Moreover, in the activated state, the first controller 57 transmits the aforementioned equalization command to the monitors 20 as necessary.

In turning the power supply switch 52 of the first controller 57 from OFF to ON, first, the second controller 67 starts transmission of the connection command C to the switch driver 53, thereby activating the first controller 57. Then, for self-holding, the activated first controller 57 starts transmission of the connection command C to the switch driver 53. Consequently, a redundant configuration of the connection command C is established; thus it becomes possible to prevent electric power supply failure of the first controller 57 due to a fault in the connection command C of the second controller 67. On the other hand, in turning the power supply switch 52 from ON to OFF, first, the first controller 57 switches the state of the connection command C from ON to OFF; then the second controller 67 switches the state of the connection command C from ON to OFF in a power supply switch diagnosis X3 to be described later.

The first controller 57 transmits an activation signal $\alpha$ to the second controller 67. The activation signal $\alpha$ is a "state signal" indicating whether the first controller 57 is in the activated state or a stopped state where the activation thereof is stopped (or a deactivated state where the first controller 57 is deactivated). Specifically, in the present embodiment, the activation signal $\alpha$ being in an ON state indicates that the first controller 57 is in the activated state; and the activation signal $\alpha$ being in an OFF state indicates that the first controller 57 is in the stopped state.

The electric power from the auxiliary battery 30 is fed to the second controller 67 through a second electric power feeding path 61 that is different from the first electric power feeding path 51. In the second electric power feeding path 61, there is provided a second power supply circuit 66. The second power supply circuit 66 is configured to transform the voltage of, for example, about 12V supplied from the auxiliary battery 30 to a voltage of, for example, 5V.

The second controller 67 is implemented by a different microcomputer from the first controller 57. In a main power supply OFF state where a main power supply switch (not shown) of the vehicle is kept OFF, the second controller 67 is kept activated (or sleeping) in a power-saving mode without completely stopping the activation thereof. The second controller 67 wakes from the sleep state in response to the main power supply switch of the vehicle being turned on by the vehicle driver or in response to a command from a superordinate ECU (not shown) of the vehicle or from an external device (not shown) connected with the vehicle. Then, the second controller 67 transmits the connection command C to the switch driver 53, thereby causing the switch driver 53 to turn on the power supply switch 52 of the first controller 57.

Moreover, the second controller 67 performs, based on both the connection command C and the activation signal $\alpha$, the power supply switch diagnosis X3 as to whether the power supply switch 52 is normal or abnormal. Specifically, in the power supply switch diagnosis X3, the second controller 67 diagnoses the power supply switch 52 as having a stuck-ON fault (i.e., as being abnormal) on condition that the activation signal $\alpha$ is in the ON state even though the connection command C is in the OFF state.

FIG. 2 illustrates a power supply control performed by the second controller 67 of the battery ECU 40 according to the present embodiment. The power supply control includes the power supply switch diagnosis X3.

In the power supply control, first, in step S110, the second controller 67 determines whether it is a preset diagnosis start timing at which the power supply switch diagnosis X3 should be started.

Specifically, the diagnosis start timing may be set to, for example, a timing immediately after the main power supply switch of the vehicle is turned from ON to OFF, i.e., a timing at which the activation of the vehicle is stopped and which is after the contactors 17 and 18 are turned from ON to OFF. Moreover, the diagnosis start timing may be set to, for example, a timing immediately after the main power supply switch of the vehicle is turned from ON to OFF and after the first controller 57 has finished storing the cell voltage information in a predetermined nonvolatile memory. In the latter case, the cell voltage information will not be lost even when the power supply switch 52 is turned off in the power supply switch diagnosis X3.

Furthermore, the diagnosis start timing may be set to, for example, a timing immediately after the main power supply switch of the vehicle is turned from ON to OFF and after the first controller 57 has finished transmitting the equalization command to the monitors 20. In this case, the diagnosis start timing is a timing before the equalization process is completed by the monitors 20; and it is preferable that the second controller 67 performs the power supply switch diagnosis X3 in parallel with the execution of the equalization process by the monitors 20. This is because the monitors 20 start the equalization process upon receipt of the equalization command, and then perform and complete the equalization process by themselves without being controlled by the first controller 57. Therefore, there will be no problem if the power supply switch 52 is turned off in the power supply switch diagnosis X3 immediately after the transmission of the equalization command and thus the first controller 57 is brought into the stopped state. Hence, by performing the power supply switch diagnosis X3 in parallel with the execution of the equalization process, it is possible to shorten the time to completion of both the power supply switch diagnosis X3 and the equalization process.

If the determination in step S110 results in a "NO" answer, i.e., if it is determined to be not the diagnosis start timing, the determination in S110 is repeated.

In contrast, if the determination in step S110 results in a "YES" answer, i.e., if it is determined to be the diagnosis start timing, the power supply control proceeds to step S120.

In step S120, the second controller 67 switches the state of the connection command C from ON to OFF. Consequently, if the power supply switch 52 is normal, the state of the activation signal $\alpha$ will be changed from ON to OFF.

In step S130, the second controller 67 determines whether the activation signal $\alpha$ is still in the ON state.

If the determination in step S130 results in a "NO" answer, i.e., if the activation signal $\alpha$ is determined to be in the OFF state, the power supply switch diagnosis X3 proceeds to step S140. In step S140, the second controller 67 diagnoses the power supply switch 52 as being normal. Then, the second controller 67 terminates the power supply control.

On the other hand, if the determination in step S130 results in a "YES" answer, i.e., if the activation signal α is determined to be still in the ON state, it is highly probable that the power supply switch 52 has a stuck-ON fault. Therefore, in this case, the power supply switch diagnosis X3 proceeds to step S150, in which the second controller 67 diagnoses the power supply switch 52 as being abnormal. Then, the second controller 67 terminates the power supply control.

FIG. 3A illustrates the changes with time of various parameters under the power supply control according to the present embodiment when the power supply switch 52 is normal.

As shown in FIG. 3A, at a predetermined first timing t1, the main power supply switch of the vehicle is turned from ON to OFF. Then, the power supply switch diagnosis X3 is started. At a predetermined second timing t2, the state of the connection command C is switched from ON to OFF (in step S120 of FIG. 2). Consequently, at a third timing t3 after the elapse of a predetermined stop response time Sr (e.g., 100 ms) from the second timing t2, the activation of the first controller 57 is stopped and thus the state of the activation signal α is changed from ON to OFF. Then, at a timing tn after the elapse of a predetermined stop confirmation time Sc (e.g., 50 ms) from the third timing t3, the change in the state of the activation signal α from ON to OFF is confirmed by the second controller 67 (i.e., the determination in step S130 of FIG. 2 results in a "NO" answer). Based on the confirmation, the power supply switch 52 is diagnosed by the second controller 67 as being normal (in step S140 of FIG. 2); thus the state of a switch normality determination flag is switched from OFF to ON.

FIG. 3B illustrates the changes with time of the various parameters under the power supply control according to the present embodiment when the power supply switch 52 has the stuck-ON fault.

As shown in FIG. 3B, at the predetermined first timing t1, the main power supply switch of the vehicle is turned from ON to OFF. Then, the power supply switch diagnosis X3 is started. At the predetermined second timing t2, the state of the connection command C is switched from ON to OFF (in step S120 of FIG. 2). However, since the power supply switch 52 has the stuck-ON fault, it cannot be turned off and thus remains on. Consequently, the first controller 57 remains in the activated state and thus the activation signal α remains in the ON state. Then, at a timing tf after the elapse of a predetermined stop waiting time Sw (e.g., 200 ms) from the second timing t2, the second controller 67 determines that the activation signal α is still in the ON state without being changed to the OFF state (i.e., the determination in step S130 of FIG. 2 results in a "YES" answer). Hence, the power supply switch 52 is diagnosed by the second controller 67 as being abnormal (in step S150 of FIG. 2); thus the state of a switch abnormality determination flag is switched from OFF to ON.

According to the present embodiment, it is possible to achieve the following advantageous effects.

In the battery ECU 40, when the activation signal α is in the ON state even though the connection command C is in the OFF state, it is highly probable that the power supply switch 52 has the stuck-ON fault. In view of the above, in the present embodiment, the second controller 67 diagnoses the power supply switch 52 as being abnormal, more specially, as having the stuck-ON fault (in step S150 of FIG. 2) on condition the activation signal α is in the ON state (i.e., the determination in step S130 of FIG. 2 results in a "YES" answer) even though the connection command C is in the OFF state (i.e., the state of the connection command C is switched from ON to OFF in step S120 of FIG. 2). Consequently, when the power supply switch 52 has the stuck-ON fault, it is possible to detect the abnormality (i.e., the stuck-ON fault) of the power supply switch 52.

Thus, it is possible to handle the abnormality of the power supply switch 52 by, for example, notifying the vehicle driver of the abnormality of the power supply switch 52, cutting off the first electric power feeding path 51 by a cutting-off means other than the power supply switch 52, or stopping the activation of the first controller 57 by a stopping means other than the power supply switch 52. As a result, it becomes easy to prevent, when the power supply switch 52 has the stuck-ON fault, dark current from continuing to flow through the first controller 57.

In the present embodiment, in the main power supply OFF state, the second controller 67 is kept activated (or sleeping) in the power-saving mode so as to turn on the power supply switch 52 of the first controller 57 as needed. Moreover, the power supply switch diagnosis X3 is performed by the second controller 67. Consequently, it becomes possible to detect the abnormality of the power supply switch 52 only by adding software for implementing the power supply switch diagnosis X3, without employing new hardware such as another microcomputer.

Second Embodiment

A battery ECU 40 according to the second embodiment has a similar configuration to the battery ECU 40 according to the first embodiment. Therefore, the differences therebetween will be mainly described hereinafter.

Figure 4:
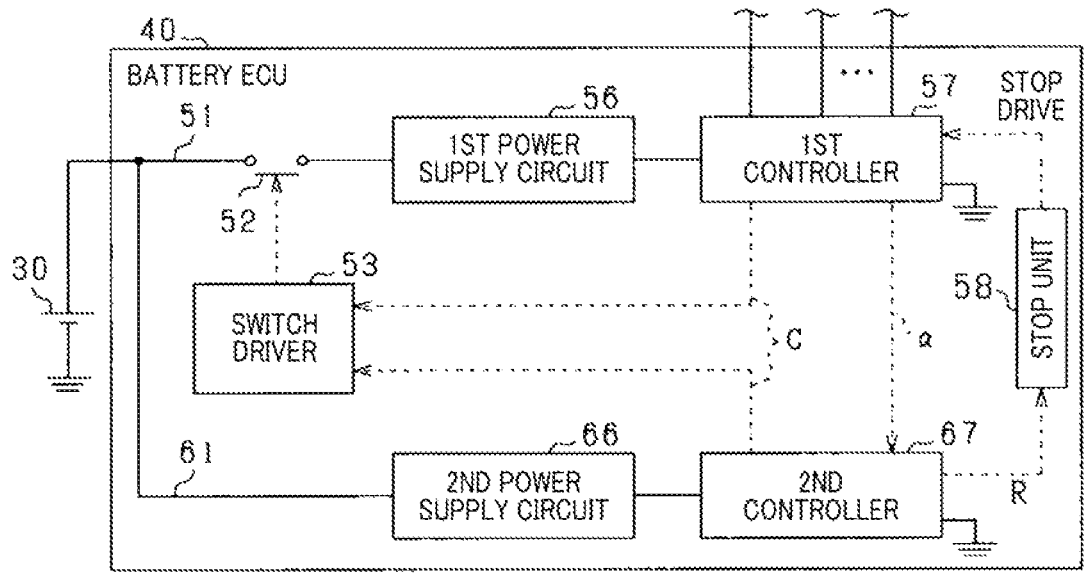
FIG. 4 is a schematic circuit diagram illustrating the configuration of an electronic control apparatus according to a second embodiment.

FIG. 4 illustrates the configuration of the battery ECU 40 according to the second embodiment. As shown in FIG. 4, in the present embodiment, the battery ECU 40 further includes, apart from the power supply switch 52, a stop unit 58 capable of stopping the activation of the first controller 57. The stop unit 58 is controlled based on a predetermined stop command R transmitted from the second controller 67.

Specifically, when the stop command R is in an ON state, the stop unit 58 keeps the first controller 57 in the stopped state by performing a predetermined stop drive even if the power supply switch 52 is in the ON state. On the other hand, when the stop command R is in an OFF state, the stop unit 58 releases the stop drive. Accordingly, in the present embodiment, the stop command R being in the ON state indicates that a "stop unit command" for the stop unit 58 is a "stop command" commanding the stop unit 58 to perform the stop drive; and the stop command R being in the OFF state indicates that the "stop unit command" is a "release command" commanding the stop unit 58 to release the stop drive.

In addition, though not shown in the figures, the stop unit 58 may be configured with, for example, a stop switch and a stop switch driver. The stop switch is provided in a bypass electrical path that connects an input terminal of the first controller 57 to the ground. The stop switch may be implemented by a semiconductor switch such as an IGBT or a MOSFET. The stop switch driver controls the stop switch based on the stop command R transmitted from the second controller 67. Specifically, when the stop command R is in the ON state commanding the stop unit 58 to perform the stop drive, the stop switch driver turns on the stop switch. Consequently, no electric power is inputted to the input terminal of the first controller 57 so that the first controller 57 is brought into the stopped state. Further, when the stop command R is switched from the ON state to the OFF state commanding the stop unit 58 to release the stop drive, the stop switch driver turns off the stop switch. Consequently, electric power is inputted to the input terminal of the first controller 57 so that the first controller 57 is brought into the activated state.

Moreover, the stop command R is normally in the OFF state, and switched to the ON state on condition that the power supply switch 52 is diagnosed as being abnormal in the power supply switch diagnosis X3. Consequently, a power supply switch abnormality handling Y3 is started in which the stop command R is kept in the ON state while the vehicle is in the main power supply OFF state.

Figure 5:
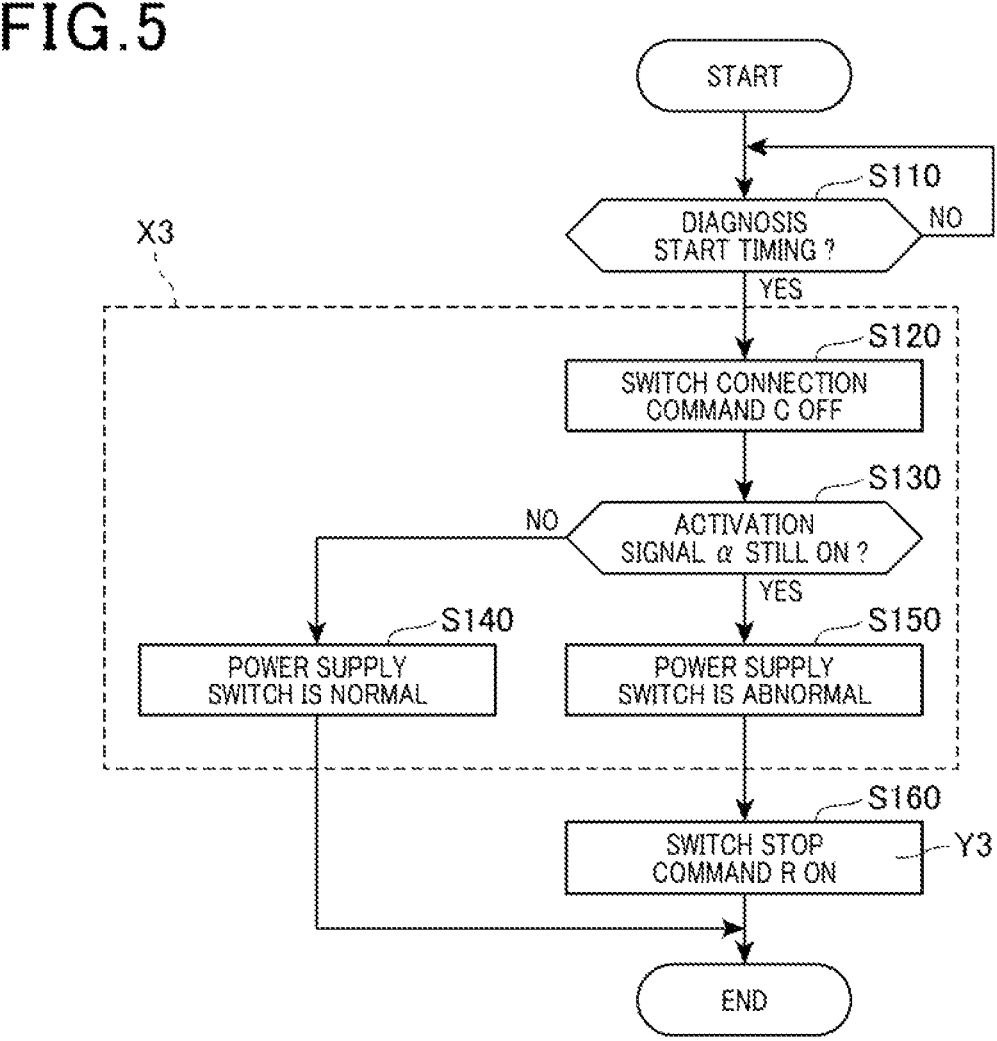
FIG. 5 is a flow chart illustrating a power supply control performed by a second controller of the electronic control apparatus according to the second embodiment.

FIG. 5 illustrates a power supply control performed by the second controller 67 of the battery ECU 40 according to the present embodiment. Compared to the power supply control according to the first embodiment (see FIG. 2), the power supply control according to the present embodiment further includes step S160.

Specifically, in the power supply control according to the present embodiment, in response to the power supply switch 52 being diagnosed as being abnormal in step S150, the state of the stop command R is switched from OFF to ON in step S160. Consequently, the power supply switch abnormality handling Y3 is started to cause the stop unit 58 to perform the stop drive and thereby bring the first controller 57 into the stopped state.

FIG. 6A illustrates the changes with time of various parameters under the power supply control according to the present embodiment when the power supply switch 52 is normal.

The stop command R remains in the OFF state when the switch abnormality determination flag remains in the OFF state, and switched from the OFF state to the ON state when the switch abnormality determination flag is switched from the OFF state to the ON state. Therefore, as shown in FIG. 6A, when the power supply switch 52 is normal, the switch abnormality determination flag remains in the OFF state and thus the stop command R also remains in the OFF state.

FIG. 6B illustrates the changes with time of the various parameters under the power supply control according to the present embodiment when the power supply switch 52 has the stuck-ON fault.

In this case, as shown in FIG. 6B, at the timing tf, the state of the switch abnormality determination flag is switched from OFF to ON (i.e., the power supply switch 52 is diagnosed as being abnormal in step S150 of FIG. 5) and thus the state of the stop command R is also switched from OFF to ON (in step S160 of FIG. 5). Consequently, the first controller 57 is brought into the stopped state where the activation thereof is stopped by the stop unit 58. That is, the power supply switch abnormality handling Y3 is performed, causing the state of the activation signal α to be changed from ON to OFF.

As above, in the battery ECU 40 according to the present embodiment, in the main power supply OFF state, the second controller 67 performs, on condition that the power supply switch 52 is diagnosed as being abnormal (i.e., as having the stuck-ON fault) in the power supply switch diagnosis X3 (in step S150 of FIG. 5), the power supply switch abnormality handling Y3 (in step S160 of FIG. 5) in which the stop command R is kept in the ON state while the vehicle is in the main power supply OFF state. Consequently, it becomes possible to prevent dark current from continuing to flow through the first controller 57 due to the stuck-ON fault of the power supply switch 52.

Third Embodiment

A battery ECU 40 according to the third embodiment has a similar configuration to the battery ECU 40 according to the second embodiment. Therefore, the differences therebetween will be mainly described hereinafter.

Figure 7:
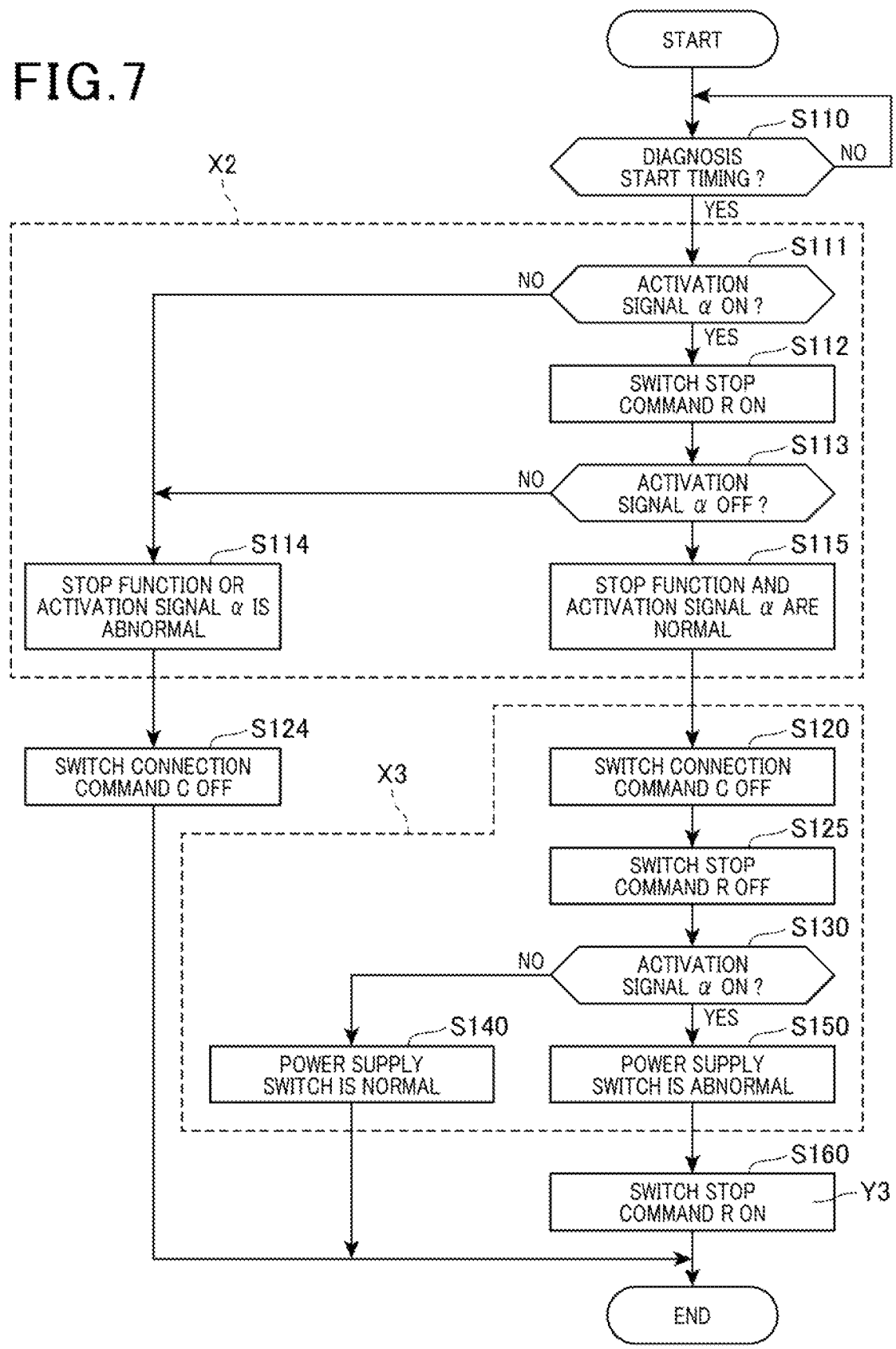
FIG. 7 is a flow chart illustrating a power supply control performed by a second controller of an electronic control apparatus according to a third embodiment.

FIG. 7 illustrates a power supply control performed by a second controller 67 of the battery ECU 40 according to the present embodiment. Compared to the power supply control according to the second embodiment (see FIG. 5), the power supply control according to the present embodiment further includes a signal diagnosis X2 that is performed, prior to the power supply switch diagnosis X3, to diagnose whether the activation signal α is normal or abnormal.

Specifically, as shown in FIG. 7, in the power supply control according to the present embodiment, the signal diagnosis X2 is started upon the determination in step S110 resulting in a "YES" answer, i.e., upon the determination that it is the preset diagnosis start timing.

Then, in the signal diagnosis X2, first, in step S111, the second controller 67 determines whether the activation signal α is in the ON state while the connection command C is in the ON state and the stop command R is in the OFF state, i.e., determines whether the activation signal α is normal.

If the determination in step S111 results in a "NO" answer, i.e., if the activation signal α is determined to be in the OFF state, it is highly probable that either the stop function of the stop unit 58 has a stuck-ON fault or the activation signal α has a stuck-OFF fault. Therefore, in this case, the signal diagnosis X2 proceeds to step S114, in which the second controller 67 diagnoses that either the stop function or the activation signal α is abnormal. Then, in step S124, the second controller 67 switches the state of the connection command C from ON to OFF. Thereafter, the second controller 67 terminates the power supply control without performing the power supply switch diagnosis X3.

On the other hand, if the determination in step S111 results in a "YES" answer, i.e., if the activation signal α is determined to be in the ON state, the signal diagnosis X2 proceeds to step S112, in which the second controller 67 switches the state of the stop command R from OFF to ON. Consequently, if both the stop function of the stop unit 58 and the activation signal α are normal, the activation of the first controller 57 will be stopped and thus the state of the activation signal α will be changed from ON to OFF.

In step S113, the second controller 67 determines whether the state of the activation signal α has been changed from ON to OFF.

If the determination in step S113 results in a "NO" answer, i.e., if the activation signal α is determined to be still in the ON state, it is highly probable that either the stop function of the stop unit 58 has a stuck-OFF fault or the activation signal α has a stuck-ON fault. Therefore, in this case, the signal diagnosis X2 proceeds to step S114, in which the second controller 67 diagnoses that either the stop function or the activation signal α is abnormal. Then, in step S124, the second controller 67 returns the state of the stop command R from ON to OFF and switches the state of the connection command C from ON to OFF. Thereafter, the second controller 67 terminates the power supply control without performing the power supply switch diagnosis X3.

On the other hand, if the determination in step S113 results in a "YES" answer, i.e., if the state of the activation signal α is determined to have been changed from ON to OFF, the signal diagnosis X2 proceeds to step S115, in which the second controller 67 diagnoses both the stop function and the activation signal α as being normal. Thereafter, the power supply control proceeds to the power supply switch diagnosis X3.

In the power supply switch diagnosis X3, first, in step S120, the second controller 67 switches the state of the connection command C from ON to OFF. Then, in step S125, the second controller 67 switches the state of the stop command R from ON to OFF. Consequently, if the power supply switch 52 is normal, with the state of the connection command C having been switched from ON to OFF, the first controller 57 will not be activated and thus the activation signal α remains in the OFF state even though the state of the stop command R has been switched from ON to OFF.

In step S130, the second controller 67 determines whether the state of the activation signal α has been changed from OFF to ON.

If the determination in step S130 results in a "NO" answer, i.e., if the activation signal α is determined to be still in the OFF state, the power supply switch diagnosis X3 proceeds to step S140. In step S140, the second controller 67 diagnoses the power supply switch 52 as being normal. Then, the second controller 67 terminates the power supply control.

On the other hand, if the determination in step S130 results in a "YES" answer, i.e., if the state of the activation signal α is determined to have been changed from OFF to ON, it is highly probable that the power supply switch 52 has the stuck-ON fault. Therefore, in this case, the power supply switch diagnosis X3 proceeds to step S150, in which the second controller 67 diagnoses the power supply switch 52 as being abnormal. Then, the power supply control proceeds to step S160, in which the second controller 67 switches the state of the stop command R from OFF to ON. Consequently, the power supply switch abnormality handling Y3 is started to cause the stop unit 58 to perform the stop drive and thereby bring the first controller 57 into the stopped state. Thereafter, the second controller 67 terminates the power supply control.

Figure 8:
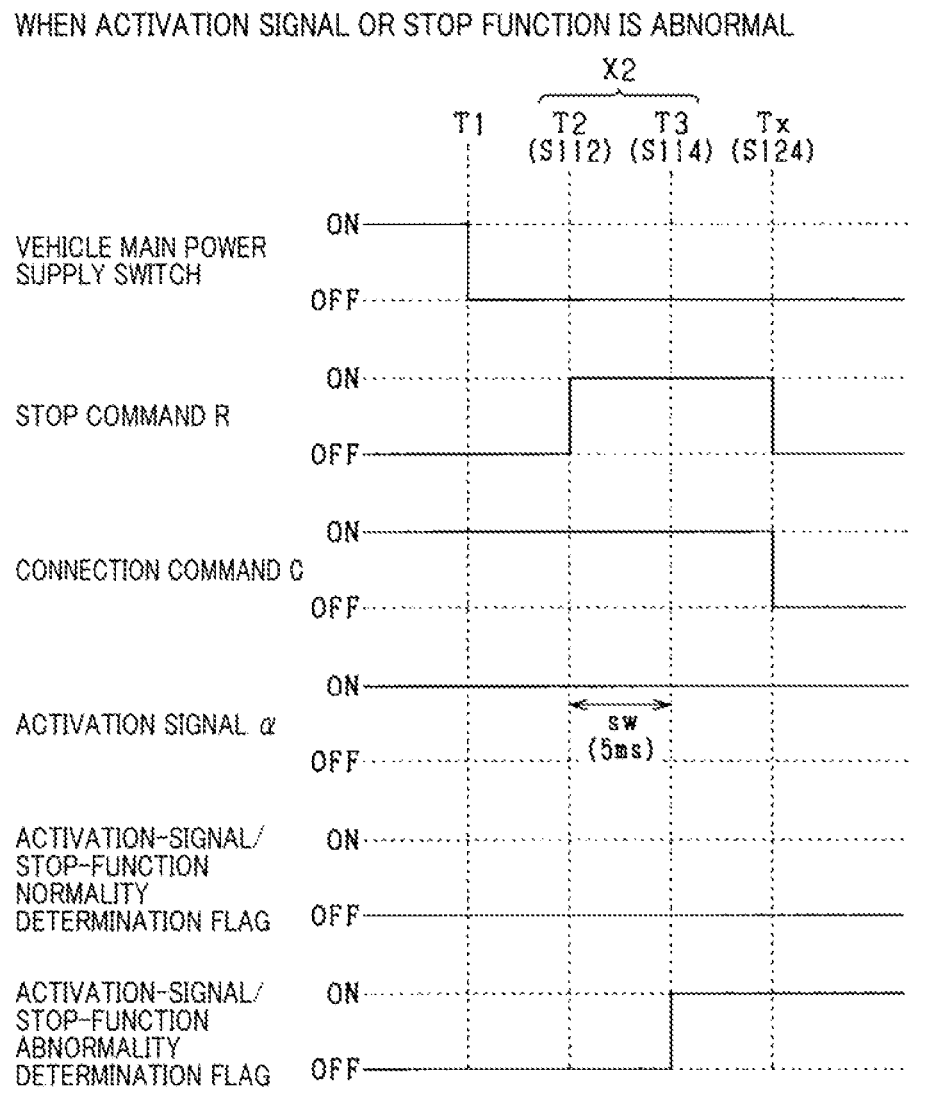

FIG. 8 illustrates the changes with time of various parameters under the power supply control according to the present embodiment when the activation signal α has the stuck-ON fault.

As shown in FIG. 8, at a predetermined first timing T1, the main power supply switch of the vehicle is turned from ON to OFF. Then, the signal diagnosis X2 is started. At a predetermined second timing T2, the state of the stop command R is switched from OFF to ON (in step S112 of FIG. 7). Consequently, the activation of the first controller 57 is stopped by the stop unit 58. However, the activation signal α remains in the ON state due to the stuck-ON fault thereof.

Then, at a third timing T3 after the elapse of a predetermined stop waiting time sw (e.g., 5 ms) from the second timing T2, the second controller 67 determines that the activation signal α is still in the ON state without being changed to the OFF state (i.e., the determination in step S113 of FIG. 7 results in a "NO" answer). Hence, the second controller 67 diagnoses that either the stop function of the stop unit 58 or the activation signal α is abnormal (in step S114 of FIG. 7); thus the state of an activation-signal/stop-function abnormality determination flag is switched from OFF to ON. Thereafter, at a predetermined timing Tx, the second controller 67 returns the state of the stop command R from ON to OFF and switches the state of the connection command C from ON to OFF (in step S124 of FIG. 7), without performing the power supply switch diagnosis X3.

Figure 9A:
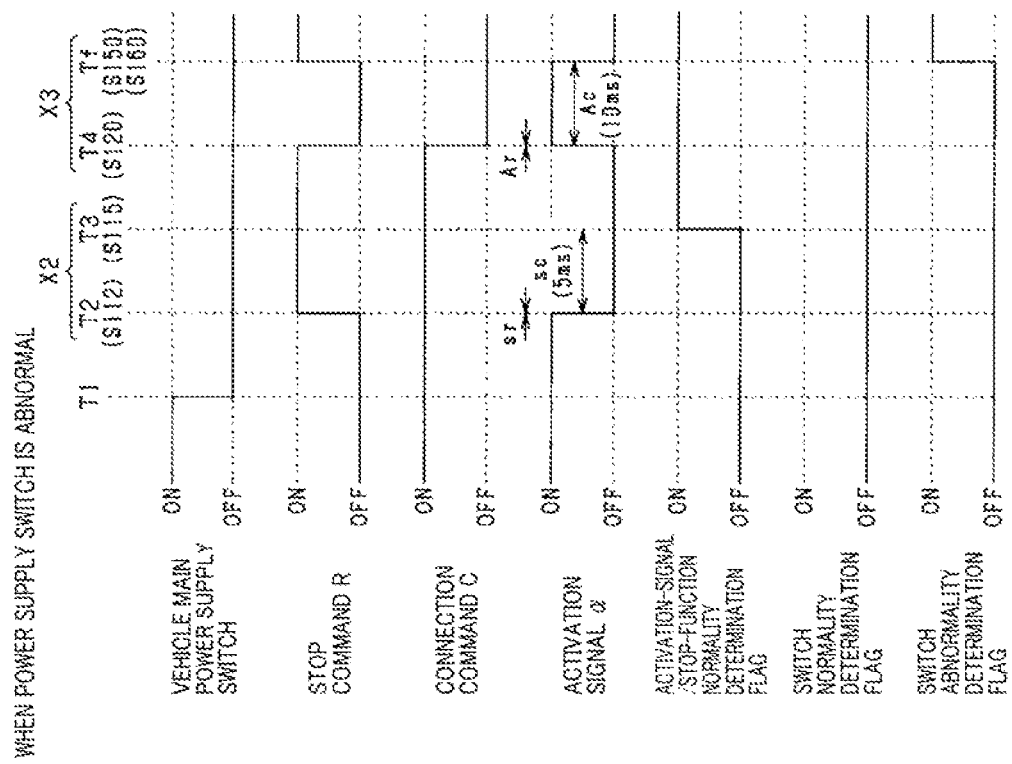
FIGS. 9A and 9B are timing charts illustrating the power supply control performed by the second controller of the electronic control apparatus according to the third embodiment when the activation signal is normal.

FIG. 9A illustrates the changes with time of the various parameters under the power supply control according to the present embodiment when both the stop function of the stop unit 58 and the activation signal α are normal and the power supply switch 52 is also normal.

As shown in FIG. 9A, at the predetermined first timing T1, the main power supply switch of the vehicle is turned from ON to OFF. Then, the signal diagnosis X2 is started. At the predetermined second timing T2, the state of the stop command R is switched from OFF to ON (in step S112 of FIG. 7). Consequently, the activation of the first controller 57 is stopped by the stop unit 58; thus, after the elapse of a slight stop response time sr (e.g., shorter than 1 ms) from the second timing T2, the state of the activation signal a is changed from ON to OFF.

Then, at a third timing T3 after the elapse of a predetermined stop confirmation time se (e.g., 5 ms) from the second timing T2, the change in the state of the activation signal α from ON to OFF is confirmed by the second controller 67 (i.e., the determination in step S113 of FIG. 7 results in a "YES" answer). Based on the confirmation, both the stop function of the stop unit 58 and the activation signal α are diagnosed by the second controller 67 as being normal (in step S115 of FIG. 7); thus the state of an activation-signal/stop-function normality determination flag is switched from OFF to ON.

Thereafter, the power supply switch diagnosis X3 is started. At a predetermined fourth timing T4, the state of the connection command C is switched from ON to OFF (in step S120 of FIG. 7); and the state of the stop command R is also switched from ON to OFF (in step S125 of FIG. 7). Since the power supply switch 52 is normal, it is turned off in response to the connection command C being switched from ON to OFF. Consequently, the first controller 57 is not activated and thus the activation signal α remains in the OFF state even though the state of the stop command R has been switched from ON to OFF. Then, at a timing Tn after the elapse of a predetermined activation waiting time Aw (e.g., 10 ms) from the fourth timing T4, the second controller 67 determines that the activation signal a is still in the OFF state without being changed to the ON state (i.e., the determination in step S130 of FIG. 7 results in a "NO" answer). Hence, the power supply switch 52 is diagnosed by the second controller 67 as being normal (in step S140 of FIG. 7); thus the state of a switch normality determination flag is switched from OFF to ON.

Figure 9B:
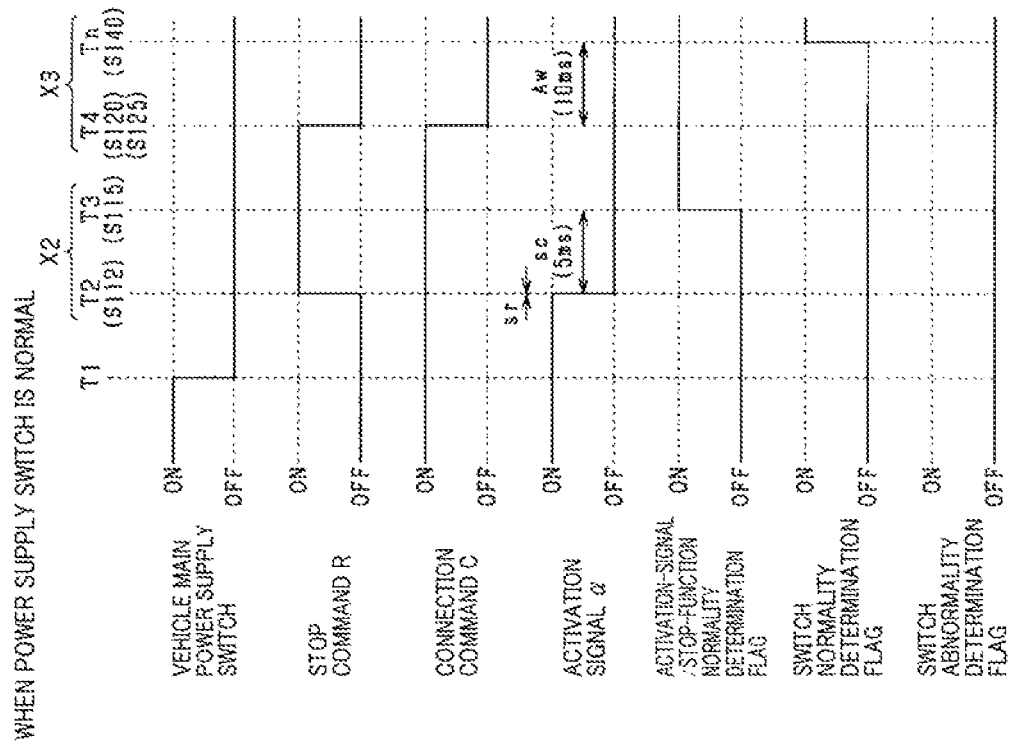

FIG. 9B illustrates the changes with time of the various parameters under the power supply control according to the present embodiment when both the stop function of the stop unit 58 and the activation signal α are normal but the power supply switch 52 has the stuck-ON fault. The changes of these parameters up to the third timing T3 in FIG. 9B are the same as those in FIG. 9A.

After the third timing T3, the power supply switch diagnosis X3 is started. At the predetermined fourth timing T4, the state of the connection command C is switched from ON to OFF (in step S120 of FIG. 7); and the state of the stop command R is also switched from ON to OFF (in step S125 of FIG. 7). Since the power supply switch 52 has the stuck-ON fault, it remains on even though the state of the connection command C has been switched from ON to OFF. Consequently, in response to the stop command R being switched from ON to OFF, the first controller 57 is activated and thus the state of the activation signal α is changed from OFF to ON. Then, at a timing Tf afer the elapse of a predetermined activation confirmation time Ac (e.g., 10 ms) from the fourth timing T4, the change in the state of the activation signal α from OFF to ON is confirmed by the second controller 67 (i.e., the determination in step S130 of FIG. 7 results in a "YES" answer). Based on the confirmation, the power supply switch 52 is diagnosed by the second controller 67 as being abnormal (in step S150 of FIG. 7); thus the state of a switch abnormality determination flag is switched from OFF to ON. Moreover, in response to the power supply switch 52 being diagnosed as being abnormal, the state of the stop command R is switched from OFF to ON (in step S160 of FIG. 7), causing the stop unit 58 to stop the activation of the first controller 57. That is, the power supply switch abnormality handling Y3 is performed, causing the state of the activation signal a to be changed from ON to OFF.

According to the present embodiment, it is possible to achieve the following advantageous effects.

In the battery ECU 40, when the activation signal α is in the OFF state even though the connection command C is in the ON state and the stop command R is in the OFF state, it is highly probable that either the stop function of the stop unit 58 has the stuck-ON fault or the activation signal α has the stuck-OFF fault. In view of the above, in the present embodiment, in the signal diagnosis X2, the second controller 67 diagnoses the activation signal α as being normal (in step S115 of FIG. 7) on condition that the activation signal a is in the ON state when the connection command C is in the ON state and the stop command R is in the OFF state (i.e., the determination in step S111 of FIG. 7 results in a "YES" answer). Consequently, it becomes possible to prevent the activation signal α from being diagnosed as being normal when it probably has the stuck-OFF fault.

Moreover, when the activation signal α is in the ON state even though the stop command R is in the ON state while the connection command C is in the ON state, it is highly probable that either the stop function of the stop unit 58 has the stuck-OFF fault or the activation signal α has the stuck-ON fault. In view of the above, in the present embodiment, in the signal diagnosis X2, the second controller 67 diagnoses the activation signal a as being normal (in step S115 of FIG. 7) on condition that the activation signal α is in the OFF state when the connection command C is in the ON state and the stop command R is also in the ON state (i.e., the determination in step S113 of FIG. 7 results in a "YES" answer). Consequently, it becomes possible to prevent the activation signal α from being diagnosed as being normal when it probably has the stuck-ON fault.

Furthermore, in the present embodiment, the second controller 67 performs, only upon diagnosing the activation signal α as being normal (in step S115 of FIG. 7), the power supply switch diagnosis X3 in which the power supply switch 52 may be diagnosed as being abnormal (in step S150 of FIG. 7). Therefore, when the activation signal a is diagnosed as being probably abnormal (in step S114 of FIG. 7), the power supply switch 52 will not be diagnosed as being abnormal (in step S150 of FIG. 7). Consequently, it becomes possible to prevent the power supply switch 52 from being misdiagnosed as being abnormal due to the abnormality of the activation signal α.

Moreover, in the present embodiment, after the stop drive is performed by switching the state of the stop command R from OFF to ON in the signal diagnosis X2, the power supply switch 52 is diagnosed in the power supply switch diagnosis X3 as being abnormal (in step S150 of FIG. 7) on condition that the state of the activation signal α has been changed from OFF to ON (i.e., the determination in step S130 of FIG. 7 results in a "YES" answer) upon the state of the connection command C being switched from ON to OFF (in step S120 of FIG. 7) and the state of the stop command R being switched from ON to OFF (in step S125 of FIG. 7). Consequently, it becomes possible to smoothly start the power supply switch diagnosis X3 after the signal diagnosis X2 in which the state of the stop command R is switched from OFF to ON.

Fourth Embodiment

A battery ECU 40 according to the fourth embodiment has a similar configuration to the battery ECU 40 according to the third embodiment. Therefore, the differences therebetween will be mainly described hereinafter.

Figure 10:
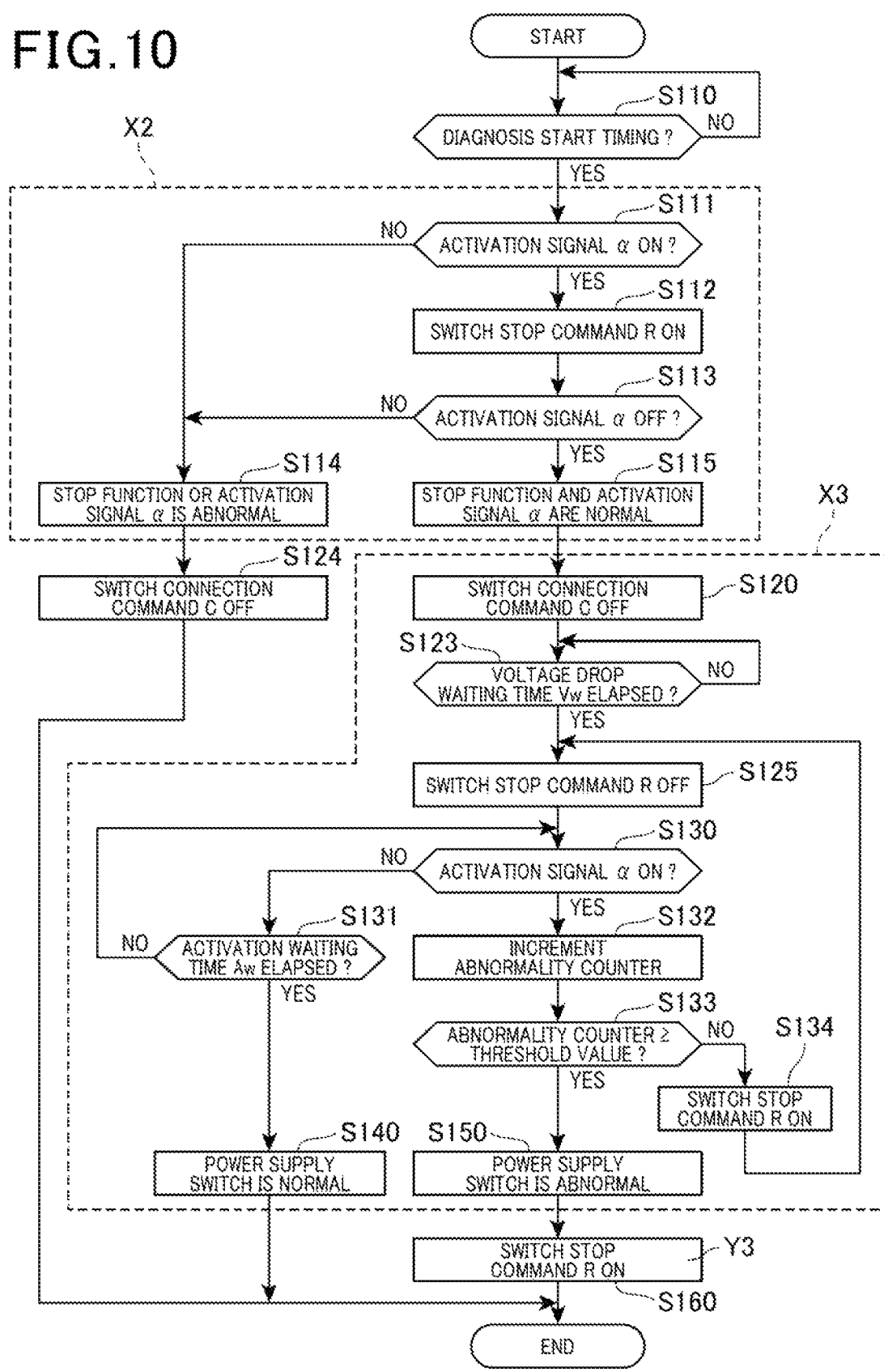
FIG. 10 is a flow chart illustrating a power supply control performed by a second controller of an electronic control apparatus according to a fourth embodiment.

FIG. 10 illustrates a power supply control performed by a second controller 67 of the battery ECU 40 according to the present embodiment. Compared to the power supply control according to the third embodiment (see FIG. 7), the power supply control according to the present embodiment differs in that the power supply switch diagnosis X3 further includes steps S123 and S131-S134.

Specifically, as shown in FIG. 10, in the power supply switch diagnosis X3 of the power supply control according to the present embodiment, after switching the state of the connection command C from ON to OFF in step S120, in subsequent step S123, the second controller 67 determines whether a predetermined voltage drop waiting time Vw has elapsed from the switching of the state of the connection command C from ON to OFF.

In addition, the voltage drop waiting time Vw is predetermined to be longer than or equal to the time from the switching of the state of the connection command C from ON to OFF until the first controller 57 becomes no longer activated even if the state of the stop command R is switched from ON to OFF in the case of the power supply switch 52 having no stuck-ON fault.

If the determination in step S123 results in a "NO" answer, i.e., if it is determined that the voltage drop waiting time Vw has not elapsed, the determination in S123 is repeated.

In contrast, if the determination in step S123 results in a "YES" answer, i.e., if it is determined that the voltage drop waiting time Vw has elapsed, the power supply switch diagnosis X3 proceeds to step S125.

In step S125, the second controller 67 switches the state of the stop command R from ON to OFF. Consequently, if the power supply switch 52 is normal, with the state of the connection command C having been switched from ON to OFF, the first controller 57 will not be activated and thus the activation signal α remains in the OFF state even though the state of the stop command R has been switched from ON to OFF.

In step S130, the second controller 67 determines whether the state of the activation signal α has been changed from OFF to ON.

If the determination in step S130 results in a "NO" answer, i.e., if the activation signal a is determined to be still in the OFF state, the power supply switch diagnosis X3 proceeds to step S131 without immediately diagnosing the activation signal α as being normal.

In step S131, the second controller 67 further determines whether a predetermined activation waiting time Aw has elapsed from the switching of the state of the stop command R from ON to OFF in step S125.

In addition, the activation waiting time Aw is predetermined to be longer than or equal to the time from when the state of the stop command R is switched from ON to OFF to release the stop drive until the state of the activation signal α is changed from OFF to ON in the case of the power supply switch 52 having the stuck-ON fault.

If the determination in step S131 results in a "NO" answer, i.e., if it is determined that the activation waiting time Aw has not elapsed, the power supply switch diagnosis X3 returns to step S130 to repeat the determination as to whether the state of the activation signal α has been changed from OFF to ON. In contrast, if the determination in step S131 results in a "YES" answer, i.e., if it is determined that the activation waiting time Aw has elapsed, the power supply switch diagnosis X3 proceeds to step S140. In step S140, the second controller 67 diagnoses the power supply switch 52 as being normal. Then, the second controller 67 terminates the power supply control.

On the other hand, if the determination in step S130 results in a "YES" answer, i.e., if the state of the activation signal a is determined to have been changed from OFF to ON, the power supply switch diagnosis X3 proceeds to step S132.

In step S132, the second controller 67 increments (i.e., adds 1 to) an abnormality counter. Specifically, the abnormality counter has an initial value of 0. The value of the abnormality counter is increased from 0 to 1 by a first execution of step S132, increased from 1 to 2 by a second execution of step S132, and so on.

In step S133, the second controller 67 determines whether the value of the abnormality counter is larger than or equal to a predetermined threshold value (e.g., 3).

If the determination in step S133 results in a "NO" answer, i.e., if the value of the abnormality counter is determined to be smaller than the threshold value, the power supply switch diagnosis X3 proceeds to step S134, in which the second controller 67 returns the state of the stop command R from OFF to ON. Then, the power supply switch diagnosis X3 returns to step S125.

In contrast, if the determination in step S133 results in a "YES" answer, i.e., if the value of the abnormality counter is determined to be larger than or equal to the threshold value, the power supply switch diagnosis X3 proceeds to step S150, in which the second controller 67 diagnoses the power supply switch 52 as being abnormal. Then, the power supply control proceeds to step S160, in which the second controller 67 switches the state of the stop command R from OFF to ON. Consequently, the power supply switch abnormality handling Y3 is started to cause the stop unit 58 to perform the stop drive and thereby bring the first controller 57 into the stopped state. Thereafter, the second controller 67 terminates the power supply control.

Figure 11A:
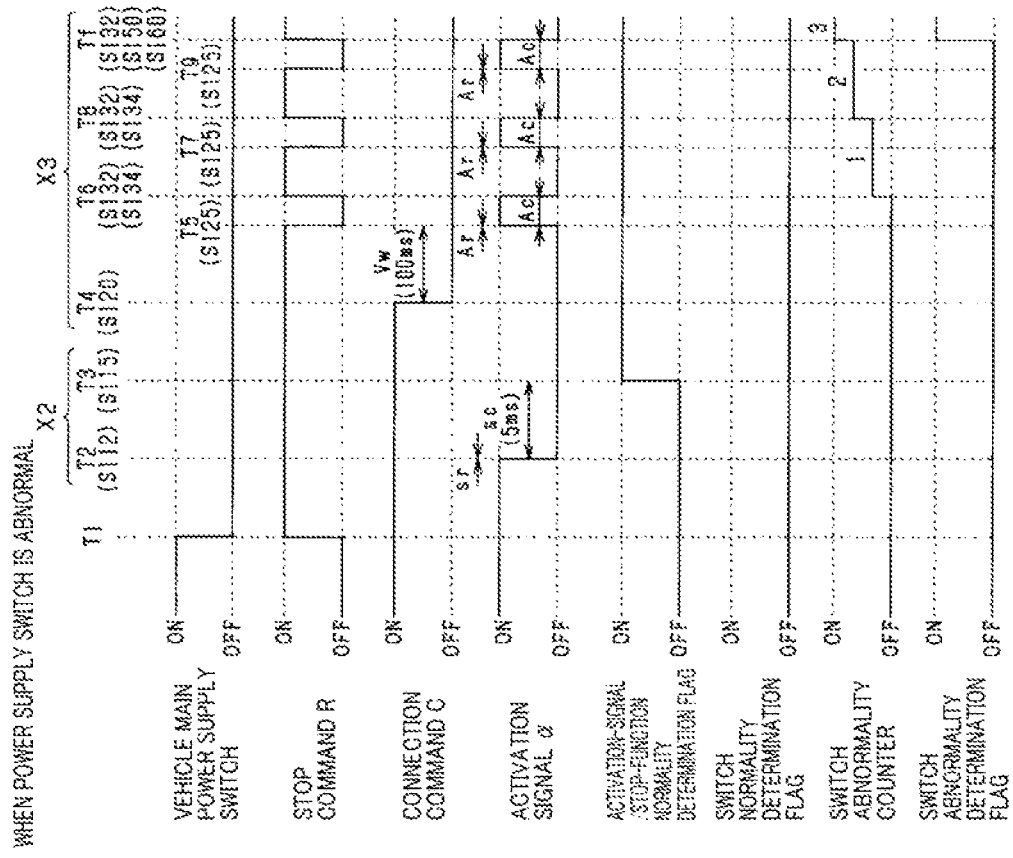
FIGS. 11A and 11B are timing charts illustrating the power supply control performed by the second controller of the electronic control apparatus according to the fourth embodiment.

FIG. 11A illustrates the changes with time of various parameters under the power supply control according to the present embodiment when both the stop function of the stop unit 58 and the activation signal α are normal and the power supply switch 52 is also normal. The changes of these parameters up to the fourth timing T4 in FIG. 11A are the same as those in FIG. 9A described in the third embodiment.

As shown in FIG. 11A, in the present embodiment, at a fifth timing T5 after the elapse of the voltage drop waiting time Vw (e.g., 100 ms) from the switching of the state of the connection command C from ON to OFF at the fourth timing T4 (in step S120 of FIG. 10), the state of the stop command R is switched from ON to OFF (in step S125 of FIG. 10). At the fifth timing T5, since the voltage drop waiting time Vw has elapsed from the switching of the state of the connection command C from ON to OFF, the voltage applied to the first controller 57 has already sufficiently dropped. Consequently, the first controller 57 becomes no longer activated even though the state of the stop command R is switched from ON to OFF and thus the stop drive is released. Then, at a timing Tn after the elapse of the activation waiting time Aw (e.g., 50 ms) from the fifth timing T5, based on the fact that the activation signal α is still in the OFF state without being changed to the ON state (i.e., the determination in step S130 of FIG. 10 results in a "NO" answer), the power supply switch 52 is diagnosed by the second controller 67 as being normal (in step S140 of FIG. 10); thus the state of a switch normality determination flag is switched from OFF to ON.

Figure 11B:
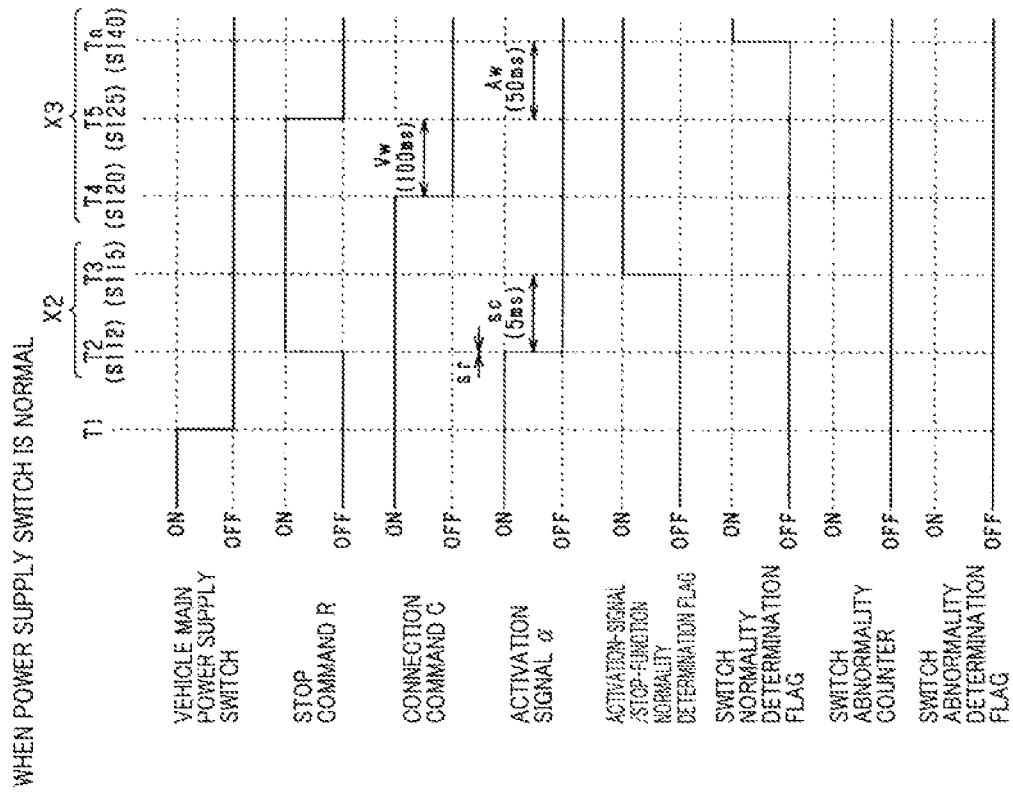

FIG. 11B illustrates the changes with time of the various parameters under the power supply control according to the present embodiment when both the stop function of the stop unit 58 and the activation signal α are normal but the power supply switch 52 has the stuck-ON fault. The changes of these parameters up to the fifth timing T5 in FIG. 11B are the same as those in FIG. 11A.

As shown in FIG. 11B, at the fifth timing T5, the state of the stop command R is switched from ON to OFF (in step S125 of FIG. 10). Since the power supply switch 52 has the stuck-ON fault, upon the state of the stop command R being switched from ON to OFF to release the stop drive, the first controller 57 is activated and thus the state of the activation signal a is changed from OFF to ON after the elapse of a slight activation response time Ar (e.g., shorter than 1 ms) from the fifth timing T5.

Then, at a sixth timing t6 after the elapse of a predetermined activation confirmation time Ac from the fifth timing T5, the change in the state of the activation signal α from OFF to ON is confirmed by the second controller 67 (i.e., the determination in step S130 of FIG. 10 results in a "YES" answer). Based on the confirmation, the value of the abnormality counter is increased from 0 to 1 (in step S132 of FIG. 10). Thereafter, the state of the stop command R is returned by the second controller 67 from OFF to ON (in step S134 of FIG. 10). Consequently, the activation of the first controller 57 is stopped and thus the state of the activation signal α is returned from ON to OFF.

At subsequent seventh and eighth timings T7 and T8, the same operations as performed at the fifth and sixth timings T5 and T6 are repeated. Consequently, the value of the abnormality counter is increased from 1 to 2 (in step S132 of FIG. 10).

At a ninth timing T9, the same operation as performed at the seventh timing T7 is repeated. Then, at a timing Tf after the elapse of the activation confirmation time Ac from the ninth timing T9, the value of the abnormality counter is increased from 2 to 3 (in step S132 of FIG. 10) by repeating the same operation as performed at the eighth timing T8. Consequently, the value of the abnormality counter reaches the threshold value of 3. Hence, the power supply switch 52 is diagnosed by the second controller 67 as being abnormal (in step S150 of FIG. 10); thus the state of a switch abnormality determination flag is switched from OFF to ON. Moreover, the state of the stop command R is also switched from OFF to ON (in step S160 of FIG. 10). Consequently, the first controller 57 is brought into the stopped state where the activation thereof is stopped by the stop unit 58. That is, the power supply switch abnormality handling Y3 is performed, causing the state of the activation signal α to be changed from ON to OFF.

According to the present embodiment, it is possible to achieve the following advantageous effects.

In the battery ECU 40, when the voltage applied to the first controller 57 does not immediately drop after the power supply switch 52 is turned off (in step S120 of FIG. 10), if the stop drive is released by switching the state of the stop command R from ON to OFF (in step S125 of FIG. 10) before the voltage drop, the first controller 57 will be activated and thus the state of the activation signal a will be changed from OFF to ON (i.e., the determination in step S130 of FIG. 10 will result in a "YES" answer). Consequently, based on the fact that the state of the activation signal α has been changed from OFF to ON, the power supply switch 52 will be misdiagnosed as being abnormal (i.e., as being stuck ON) (in step S150 of FIG. 10) although it is actually normal.

In view of the above, in the power supply switch diagnosis X3 of the power supply control according to the present embodiment, the second controller 67 diagnoses the power supply switch 52 as being abnormal (in step S150 of FIG. 10) on condition that the state of the activation signal α has been changed from OFF to ON (i.e., the determination in step S130 of FIG. 10 results in a "YES" answer) by releasing the stop drive by switching the state of the stop command R from ON to OFF (in step S125 of FIG. 10) after the elapse of the predetermined voltage drop waiting time Vw from the switching of the state of the connection command C from ON to OFF (in step S120 of FIG. 10) (i.e., after the determination in step 123 of FIG. 10 results in a "YES" answer). The voltage drop waiting time Vw is predetermined to be longer than or equal to the time from the switching of the state of the connection command C from ON to OFF (in step S120 of FIG. 10) until the first controller 57 becomes no longer activated even if the state of the stop command R is switched from ON to OFF in the case of the power supply switch 52 having no stuck-ON fault. Consequently, by sufficiently securing the voltage drop waiting time Vw as above, when the voltage applied to the first controller 57 does not immediately drop after the power supply switch 52 is turned off, it is possible to prevent the power supply switch 52 from being misdiagnosed as being abnormal (i.e., as being stuck ON) (in step S150 of FIG. 10) due to the activation of the first controller 57.

Moreover, in the battery ECU 40, when the power supply switch 52 has the stuck-ON fault, if there is a time lag until the first controller 57 is activated after the stop drive is released by switching the state of the stop command R from ON to OFF (in step S125 of FIG. 10), the first controller 57 will not be immediately activated and thus the state of the activation signal α will not be immediately changed from OFF to ON. Consequently, before the activation of the first controller 57, the power supply switch 52 will be misdiagnosed, based on the fact that the activation signal a is still in the OFF state (i.e., the determination in step S130 of FIG. 10 results in a "NO" answer), as being normal (in step S140 of FIG. 10) although it is actually abnormal (i.e., stuck ON).

In view of the above, in the power supply switch diagnosis X3 of the power supply control according to the present embodiment, the second controller 67 diagnoses the power supply switch 52 as being abnormal (in step S150 of FIG. 10) on condition that the state of the activation signal α has been changed from OFF to ON (i.e., the determination in step S130 of FIG. 10 results in a "YES" answer) before the predetermined activation waiting time Aw has elapsed from when the state of the stop command R is switched from ON to OFF (in step S125 of FIG. 10) to release the stop drive (i.e., before the determination in step S131 of FIG. 10 results in a "YES" answer). The activation waiting time Aw is predetermined to be longer than or equal to the time from when the state of the stop command R is switched from ON to OFF (in step S125 of FIG. 10) to release the stop drive until the state of the activation signal α is changed from OFF to ON in the case of the power supply switch 52 having the stuck-ON fault. Consequently, by sufficiently securing the activation waiting time Aw as above, when the first controller 57 is not immediately activated after the stop drive is released by switching the state of the stop command R from ON to OFF, it is possible to prevent the power supply switch 52 from being misdiagnosed as being normal (in step S140 of FIG. 10).

Moreover, in the battery ECU 40, if the activation confirmation time Ac is too long, the first controller 57, which is activated due to the stuck-ON fault of the power supply switch 52, may start an unintended operation during the activation confirmation time Ac. Here, the activation confirmation time Ac denotes the time from when the state of the activation signal α is changed from OFF to ON until the change in the state of the activation signal a from OFF to ON is confirmed by the second controller 57 (i.e., the determination in step S130 of FIG. 10 results in a "YES" answer). On the other hand, if the activation confirmation time Ac is too short, due to noise or the like, the first controller 57, which is actually not activated, may be erroneously determined to be activated; consequently, the power supply switch 52 may be misdiagnosed as being abnormal (in step S150 of FIG. 10).

In view of the above, in the power supply switch diagnosis X3 of the power supply control according to the present embodiment, the second controller 67 is configured to diagnose the power supply switch 52 as being abnormal (in step S150 of FIG. 10) on condition that a series of operations have been repeated a plurality of times (i.e., the determination in step S133 results in a "YES" answer) with the state of the connection command C having been switched from ON to OFF (in step S125 of FIG. 10). The series of operations include: releasing, when the stop drive is performed with the stop command R placed in the ON state (in steps S112 and S134), the stop drive by switching the stop command R from ON to OFF (in step S125 of FIG. 10); and then having the state of the activation signal α changed from OFF to ON (i.e., the determination in step S130 of FIG. 10 resulting in a "YES" answer). Therefore, even if the activation confirmation time Ac for each execution of the series of operations is set to be short, it is still possible to ensure the accuracy of the power supply switch diagnosis X3 by repeating the series of operations by the plurality of times. Consequently, it becomes possible to ensure the accuracy of the power supply switch diagnosis X3 while preventing the first controller 57 from starting an unintended operation during the activation confirmation time Ac.

Fifth Embodiment

A battery ECU 40 according to the fifth embodiment has a similar configuration to the battery ECU 40 according to the fourth embodiment. Therefore, the differences therebetween will be mainly described hereinafter.

Figure 12:
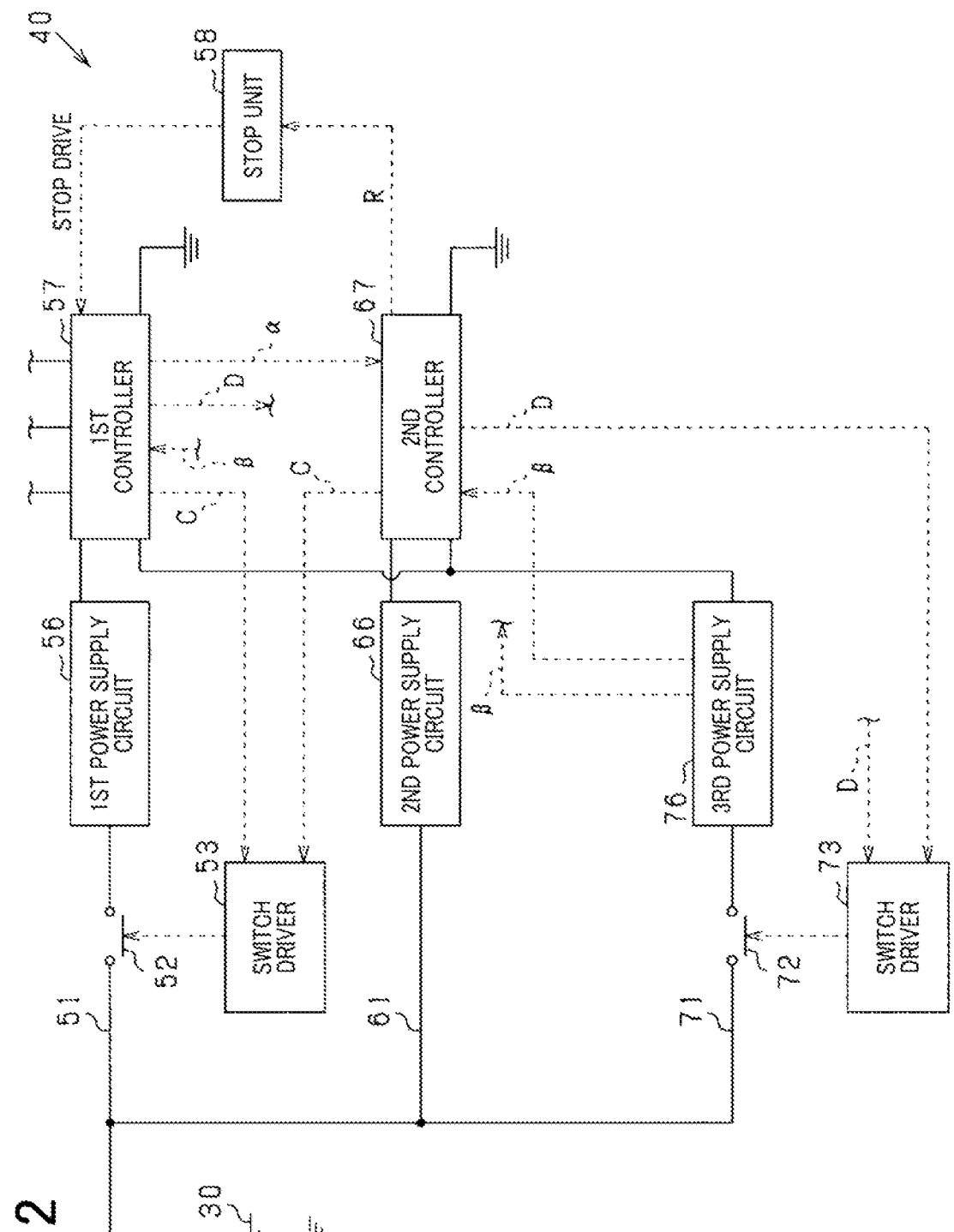
FIG. 12 is a schematic circuit diagram illustrating the configuration of an electronic control apparatus according to a fifth embodiment.

FIG. 12 illustrates the configuration of the battery ECU 40 according to the fifth embodiment. As shown in FIG. 12, compared to the battery ECU 40 according to the fourth embodiment, the battery ECU 40 according to the fifth embodiment further includes a third electric power feeding path 71, a power feeding switch 72 and a third power supply circuit 76 both of which are provided in the third electric power feeding path 71, and a switch driver 73 for driving the power feeding switch 72. Through the third electric power feeding path 71, the electric power from the auxiliary battery 30 is fed to predetermined parts of the first and second controllers 57 and 67.

The power feeding switch 72 is controlled by the switch driver 73. Specifically, the switch driver 73 controls the power feeding switch 72 based on a power feeding command D transmitted from the first controller 57 and the second controller 67.

More specifically, when the power feeding command D is in an ON state, the switch driver 73 turns on the power feeding switch 72 and thereby connects the third electric power feeding path 71 so as to enable it to transmit electric power. On the other hand, when the power feeding command D is in an OFF state, the switch driver 73 turns off the power feeding switch 72 and thereby cuts off the third electric power feeding path 71 so as to disable it from transmitting electric power. Accordingly, in the present embodiment, the power feeding command D being in the ON state indicates that a "power-feeding switch command" for the power feeding switch 72 is a "power feeding command"; and the power feeding command D being in the OFF state indicates that the "power-feeding switch command" is a "cutoff command".

In the main power supply ON state where the main power supply switch of the vehicle is kept ON, the power feeding command D is basically transmitted from both the first controller 57 and the second controller 67 to the switch driver 73; thus a redundant configuration of the power feeding command D is established. However, upon the main power supply switch of the vehicle being turned from ON to OFF, the first controller 57 first switches the state of the power feeding command D transmitted therefrom to the switch driver 73 from ON to OFF; then, the second controller 67 switches the state of the power feeding command D transmitted therefrom to the switch driver 73 from ON to OFF in a power-feeding switch diagnosis X1 which will be described later.

The third power supply circuit 76 may be, for example, a reference voltage circuit. The third power supply circuit 76 is configured to transform the voltage of, for example, about 12V supplied from the auxiliary battery 30 to a voltage of, for example, 5V substantially constantly and accurately regardless of change in the voltage of the auxiliary battery 30 and variations in the temperature and the like. In the present embodiment, the electric power from the auxiliary battery 30 is fed through the first and second electric power feeding paths 51 and 61 to those parts of the first and second controllers 57 and 67 to which electric power for activating the first and second controllers 57 and 67 is supplied. On the other hand, the electric power from the auxiliary battery 30 is fed through the third electric power feeding path 71 to the predetermined parts (e.g., reference-voltage input ports) of the first and second controllers 57 and 67 which require high voltage accuracy.

The state of the power feeding command D is switched from OFF to ON only when the state of the connection command C is switched from OFF to ON. Therefore, when both the power supply switch 52 and the power feeding switch 72 are normal, the power feeding switch 72 will not be in the ON state while the power supply switch 52 is in the OFF state. Consequently, when both the power supply switch 52 and the power feeding switch 72 are normal, the electric power from the auxiliary battery 30 will not be fed through the third electric power feeding path 71 to the predetermined part of the first controller 57 while the other parts of the first controller 57 are not fed with the electric power from the auxiliary battery 30 through the first electric power feeding path 51.

The third power supply circuit 76 transmits an output signal β to both the first and second controllers 57 and 67. The output signal β is a power-feeding state signal indicating whether a predetermined voltage is outputted from the third electric power feeding path 71. Specifically, in the present embodiment, the output signal β being in an ON state indicates an output state where the predetermined voltage is outputted from the third electric power feeding path 71; the output signal β being in an OFF state indicates a non-output state where no voltage is outputted from the third electric power feeding path 71.

More specifically, the third power supply circuit 76 performs a self-diagnosis. Moreover, the third power supply circuit 76 sets the output signal β to the ON state when the voltage outputted by it is higher than or equal to the predetermined voltage, and to the OFF state when the voltage outputted by it is lower than the predetermined voltage.

In the present embodiment, prior to performing the signal diagnosis X2 and the power supply switch diagnosis X3, the second controller 67 performs, based on both the power feeding command D and the output signal β, the power-feeding switch diagnosis X1 as to whether the power feeding switch 72 has a stuck-ON fault.

Figure 13:
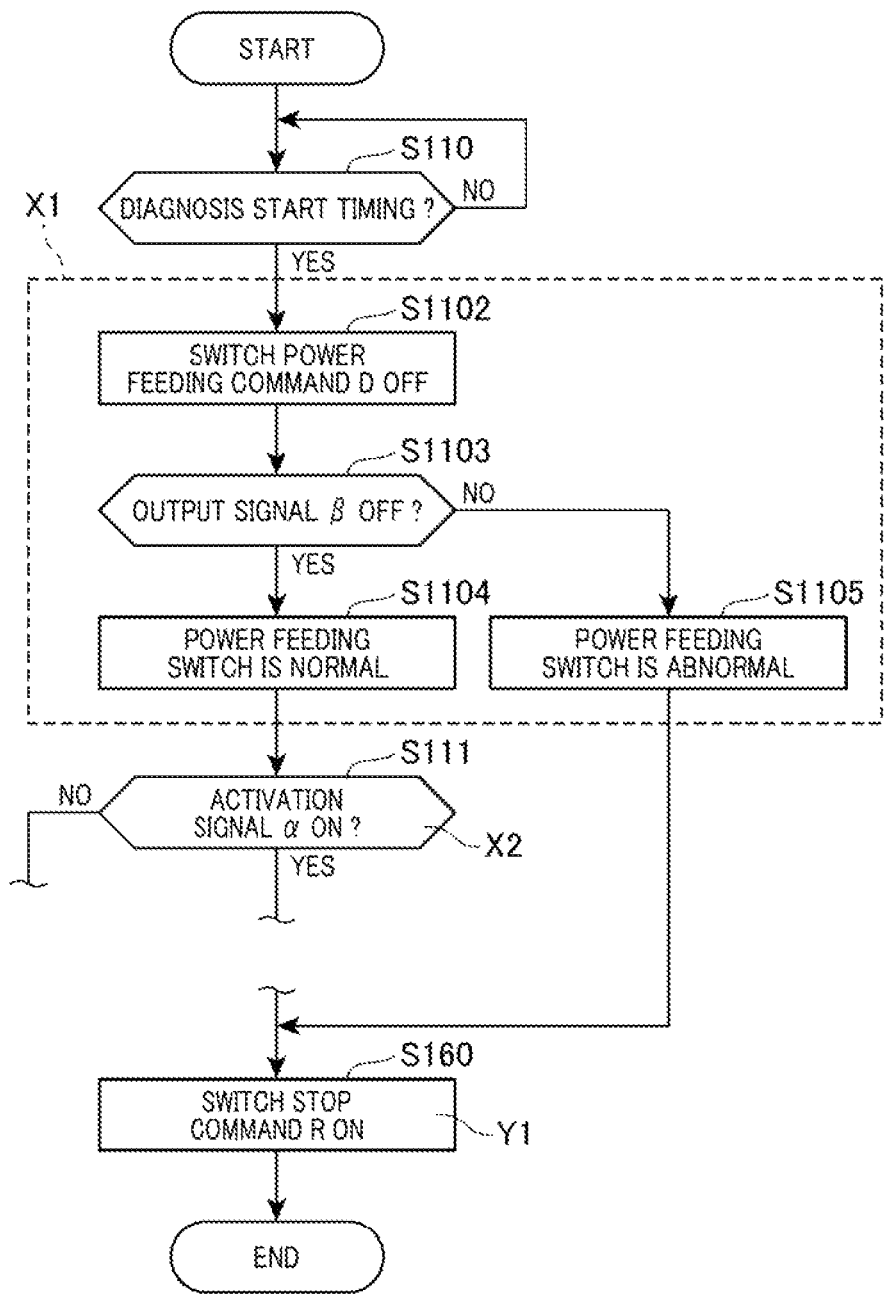
FIG. 13 is a flow chart illustrating a power supply control performed by a second controller of the electronic control apparatus according to the fifth embodiment.

FIG. 13 illustrates a power supply control performed by the second controller 67 of the battery ECU 40 according to the present embodiment. Compared to the power supply control according to the fourth embodiment (see FIG. 10), the power supply control according to the present embodiment differs in that the power-feeding switch diagnosis X1 is performed prior to the signal diagnosis X2, i.e., performed between steps S110 and S111.

Specifically, as shown in FIG. 13, in the power supply control according to the present embodiment, if the determination in step S110 results in a "YES" answer, i.e., if it is determined to be the diagnosis start timing, the power supply control proceeds to step S1102.

In step S1102, the second controller 67 switches the state of the power feeding command D from ON to OFF. Consequently, if the power feeding switch 72 is normal, it will be turned from ON to OFF and thus the state of the output signal β will be changed from ON to OFF.

In step S1103, the second controller 67 determines whether the state of the output signal β has been changed from ON to OFF.

If the determination in step S1103 results in a "YES" answer, i.e., if the state of the output signal β is determined to have been changed from ON to OFF, the power-feeding switch diagnosis X1 proceeds to step S1104, in which the second controller 67 diagnoses the power feeding switch 72 as being normal. Thereafter, the power supply control proceeds to step S111, i.e., to the signal diagnosis X2.

On the other hand, if the determination in step S1103 results in a "NO" answer, i.e., if the output signal β is determined to be still in the ON state, the power-feeding switch diagnosis X1 proceeds to step S1105, in which the second controller 67 diagnoses the power feeding switch 72 as having the stuck-ON fault (i.e., as being abnormal). Then, the power supply control proceeds, with the connection command C kept in the ON state, to step S160 without performing the signal diagnosis X2 and the power supply switch diagnosis X3.

In step S160, the second controller 67 switches the state of the stop command R from OFF to ON. Consequently, a power-feeding switch abnormality handling Y1 is started in which both the connection command C and the stop command R are kept in the ON state while the vehicle is in the main power supply OFF state. Thereafter, the second controller 67 terminates the power supply control.

In the above-described power supply control according to the present embodiment, when the power feeding switch 72 is diagnosed as having the stuck-ON fault (in step S1105 of FIG. 13) in the power-feeding switch diagnosis X1, both the signal diagnosis X2 and the power supply switch diagnosis X3 are skipped. However, in this case, although the result of the signal diagnosis X2 is not used in the power supply switch diagnosis X3, the signal diagnosis X2 may be performed for confirming the normality of the stop function of the stop unit 58 and the normality of the activation signal α. Moreover, for the same purpose, the signal diagnosis X2 may alternatively be performed separately from the power supply control.

In the above-described power supply control according to the present embodiment, in S1103, the second controller 67 determines, upon confirming twice at predetermined timings that the output signal β is in the OFF state, that the state of the output signal β has been changed from ON to OFF (i.e., the determination in step S1103 results in a "YES" answer). Moreover, in S1103, the second controller 67 determines, upon confirming that the output signal β remains in the ON state for a predetermined stop waiting time SW, that the output signal § is still in the ON state (i.e., the determination in step S1103 results in a "NO" answer).

Figure 14A:
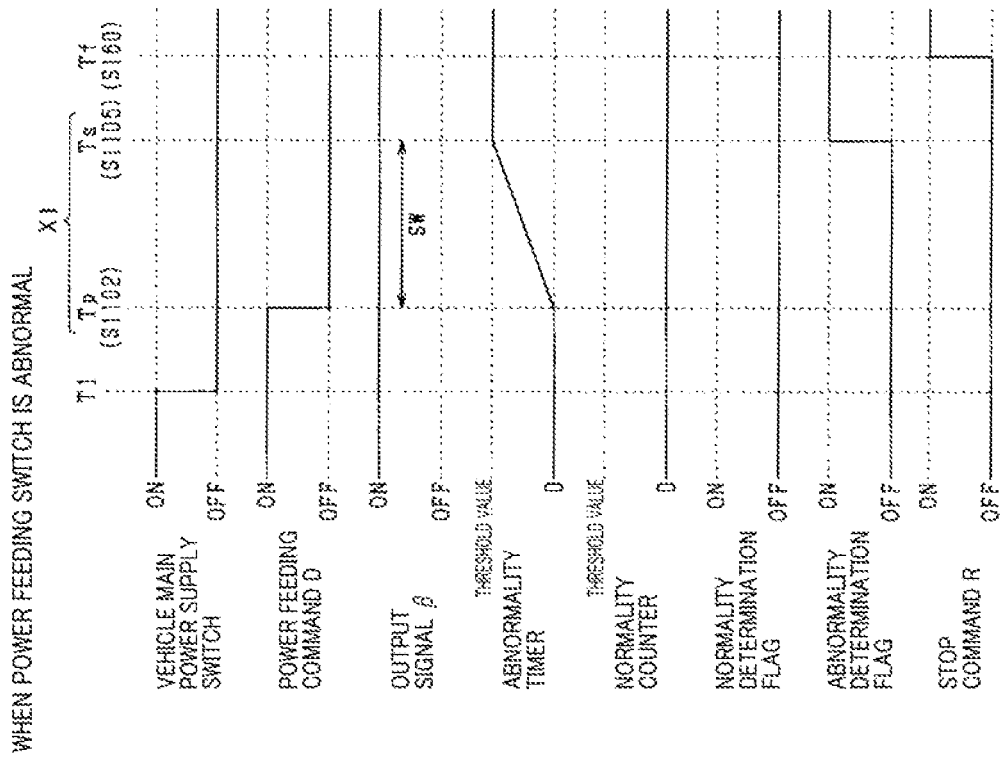
FIGS. 14A and 14B are timing charts illustrating the power supply control performed by the second controller of the electronic control apparatus according to the fifth embodiment.

FIG. 14A illustrates the changes with time of various parameters under the power supply control according to the present embodiment when the power feeding switch 72 is normal.

As shown in FIG. 14A, in the present embodiment, at a predetermined first timing T1, the main power supply switch of the vehicle is turned from ON to OFF. Then, the power-feeding switch diagnosis X1 is started. At a predetermined timing Tp, the state of the power feeding command D is switched from ON to OFF (in step S1102 of FIG. 13). Moreover, an abnormality timer, which indicates the elapsed time from the timing Tp, starts to increase.

At a timing Tq after the elapse of a predetermined stop response time SR from the timing Tp, the power feeding switch 72 is turned from ON to OFF and thus the state of the output signal β is changed from ON to OFF. Consequently, a normality counter is incremented from 0 to 1 while the abnormality timer is reset to 0. Further, at a timing Tr after the elapse of a predetermined stop confirmation time SC from the timing Tq, the normality counter is incremented from 1 to 2 based on the fact that the output signal β is still in the OFF state without being changed to the ON state. Consequently, the value of the normality counter reaches a threshold value of 2. Hence, the power feeding switch 72 is diagnosed by the second controller 67 as being normal (in step S1104 of FIG. 13); thus the state of a normality determination flag is switched from OFF to ON.

Thereafter, when either the stop function of the stop unit 58 or the activation signal α is abnormal, the changes of the parameters under the power supply control according to the present embodiment are the same as those from the second timing T2 on in FIG. 8 described in the third embodiment. On the other hand, when both the stop function of the stop unit 58 and the activation signal α are normal and the power supply switch 52 is also normal, the changes of the parameters under the power supply control according to the present embodiment are the same as those from the second timing T2 on in FIG. 11A described in the fourth embodiment. Otherwise, when both the stop function of the stop unit 58 and the activation signal a are normal but the power supply switch 52 is abnormal, the changes of the parameters under the power supply control according to the present embodiment are the same as those from the second timing T2 on in FIG. 11B described in the fourth embodiment.

Figure 14B:
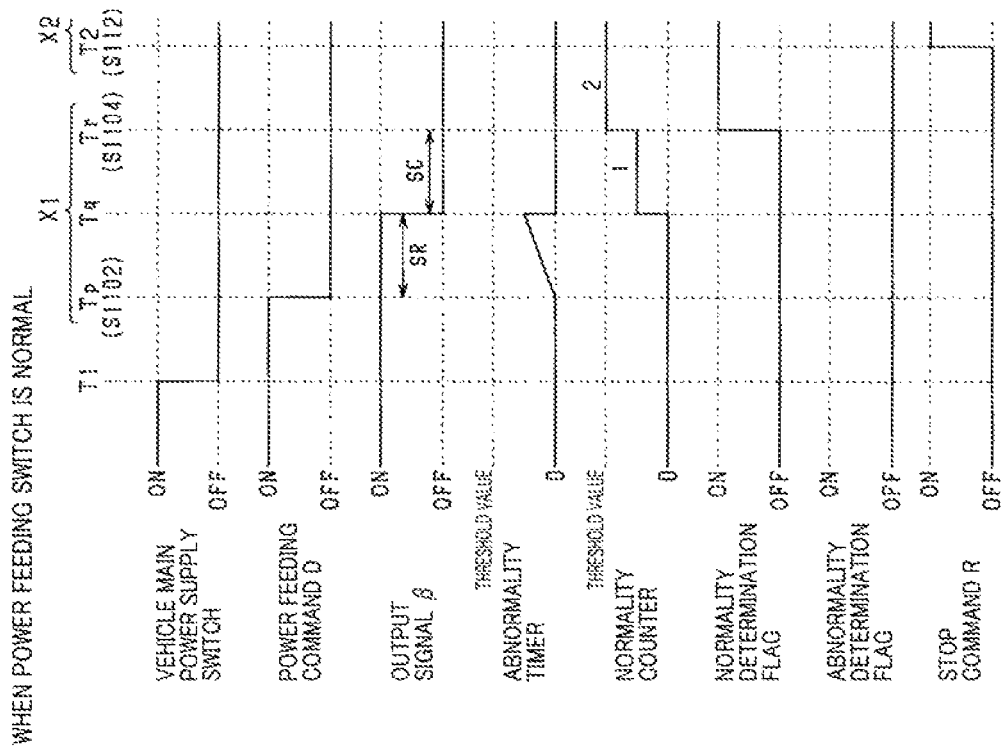

FIG. 14B illustrates the changes with time of the various parameters under the power supply control according to the present embodiment when the power feeding switch 72 has the stuck-ON fault. The changes of these parameters up to the predetermined timing Tp in FIG. 14B are the same as those in FIG. 14A.

As shown in FIG. 14B, at the predetermined timing Tp, the state of the power feeding command D is switched from ON to OFF (in step S1102 of FIG. 13); and the abnormality timer, which indicates the elapsed time from the timing Tp, starts to increase.

However, since the power feeding switch 72 has the stuck-ON fault, it cannot be turned off and thus remains on even though the state of the power feeding command D has been switched from ON to OFF. Consequently, the output signal § remains in the ON state; thus the abnormality timer continues increasing without being reset. Then, upon the abnormality timer reaching a threshold value at a timing Ts after the elapse of a predetermined stop waiting time SW from the timing Tp, the power feeding switch 72 is diagnosed by the second controller 67 as being abnormal (in step S1105 of FIG. 13); thus the state of an abnormality determination flag is switched from OFF to ON. Thereafter, at a predetermined timing Tf, the state of the stop command R is switched from OFF to ON (in step S160 of FIG. 13). Consequently, the power-feeding switch abnormality handling Y1 is started in which both the connection command C and the stop command R are kept in the ON state while the vehicle is in the main power supply OFF state.

According to the present embodiment, it is possible to achieve the following advantageous effects.

In the battery ECU 40 according to the present embodiment, when the power feeding switch 72 has the stuck-ON fault, if the power supply switch 52 is turned off, electric power will be fed, due to the stuck-ON fault of the power feeding switch 72, to only the predetermined part of the first controller 57. Consequently, predetermined failures, such as a withstand-voltage breakdown, may occur in the first controller 57.

In view of the above, in the power-feeding switch diagnosis X1 of the power supply control according to the present embodiment, upon diagnosing the power feeding switch 72 as having the stuck-ON fault (in step S105 of FIG. 13), the second controller 67 performs the power-feeding switch abnormality handling Y1 (in step S160 of FIG. 13) of keeping both the connection command C and the stop command R in the ON state while the vehicle is in the main power supply OFF state. Consequently, by keeping the connection command C in the ON state as above, it becomes possible to prevent electric power from being fed to only the predetermined part of the first controller 57. Moreover, by keeping the stop command R in the ON state as above, it becomes possible to keep the first controller 57 in the stopped state, thereby preventing dark current from flowing through the first controller 57.

Moreover, in the battery ECU 40 according to the present embodiment, when the power feeding switch 72 has the stuck-ON fault, it is necessary to perform the power-feeding switch abnormality handling Y1 instead of the power supply switch abnormality handling Y3 even if the power supply switch 52 is abnormal. Accordingly, it is unnecessary to diagnose whether the power supply switch 52 is abnormal. In view of the above, in the power supply control according to the present embodiment, the second controller 67 performs, only upon diagnosing the power feeding switch 72 as having no stuck-ON fault in the power-feeding switch diagnosis X1, the power supply switch diagnosis X3 to diagnose whether the power supply switch 52 is abnormal. Accordingly, when the power feeding switch 72 is diagnosed as having the stuck-ON fault, the second controller 67 will not diagnose whether the power supply switch 52 is abnormal. Consequently, it becomes possible to omit the unnecessary diagnosis as to whether the power supply switch 52 is abnormal.

Furthermore, in the power-feeding switch diagnosis X1 of the power supply control according to the present embodiment, the second controller 67 diagnoses the power feeding switch 72 as having the stuck-ON fault (in step S1105 of FIG. 13) on condition that the output signal β is in the ON state (i.e., the determination in step S1103 of FIG. 13 results in a "NO" answer) when the power feeding command D is in the OFF state (i.e., the state of the power feeding command D has been switched from ON to OFF in step S1102 of FIG. 13). Consequently, it becomes possible to detect the stuck-ON fault of the power feeding switch 72 by a simple method.

Sixth Embodiment

A battery ECU 40 according to the sixth embodiment has a similar configuration to the battery ECU 40 according to the first embodiment. Therefore, the differences therebetween will be mainly described hereinafter.

FIG. 15 illustrates a power supply control performed by a second controller 67 of the battery ECU 40 according to the present embodiment. Compared to the power supply control according to the first embodiment (see FIG. 2), the power supply control according to the present embodiment further includes step S117 between steps S110 and S120.

Specifically, as shown in FIG. 15, in the power supply control according to the present embodiment, the power supply switch diagnosis X3 is started upon the determination in step S110 resulting in a "YES" answer, i.e., upon the determination that it is the preset diagnosis start timing.

Then, in the power supply switch diagnosis X3, first, in step S117, the second controller 67 determines whether the activation signal α is in the ON state while the connection command C is in the ON state.

If the determination in step S117 results in a "NO" answer, i.e., if the activation signal α is determined to be in the OFF state, it is highly probable that the power supply switch 52 has a stuck-OFF fault. Therefore, in this case, the power supply switch diagnosis X3 proceeds to step S150, in which the second controller 67 diagnoses the power supply switch 52 as being abnormal. Then, the second controller 67 terminates the power supply control.

On the other hand, if the determination in step S117 results in a "YES" answer, i.e., if the activation signal α is determined to be in the ON state, the power supply switch diagnosis X3 proceeds to step S120. Since steps S120-S150 of the power supply switch diagnosis X3 according to the present embodiment are the same as those of the power supply switch diagnosis X3 (see FIG. 2) according to the first embodiment, the explanation thereof is not repeated hereinafter.

As above, in the power supply control according to the present embodiment, the power supply switch 52 is diagnosed as being abnormal when it has the stuck-OFF fault as well as when it has the stuck-ON fault. Consequently, it becomes possible to perform both a stuck-ON diagnosis and a stuck-OFF diagnosis for the power supply switch 52.

Other Embodiments

While the above particular embodiments have been shown and described, it will be understood by those skilled in the art that various modifications, changes and improvements may be made without departing from the spirit of the present disclosure.

For example, the configurations of the battery ECUs 40 according to the above-described embodiments can also be applied to vehicular electronic control apparatuses other than the battery ECUs 40.

In the above-described embodiments, the battery ECU 40 is configured so that both the first controller 57 and the second controller 67 transmit the connection command C to the switch driver 53. Alternatively, the battery ECU 40 may be configured so that only the second controller 67 transmits the connection command C to the switch driver 53.

In the above-described embodiments, the connection command C is transmitted as the "switch command" for the power supply switch 52. Alternatively, a cutoff command may be transmitted as the "switch command". In this case, the cutoff command being in an OFF state indicates that the "switch command" is a "connection command"; and the cutoff command being in an ON state indicates that the "switch command" is a "cutoff command".

In the above-described embodiments, the activation signal α is transmitted as the "state signal" indicating whether the first controller 57 is in the activated state or the stopped state. Alternatively, a stop signal may be transmitted as the "state signal". In this case, the stop signal being in an OFF state indicates that the first controller 57 is in the activated state; and the stop signal being in an ON state indicates that the first controller 57 is in the stopped state.

In the second to the fifth embodiments, the stop command R is transmitted as the "stop unit command" for the stop unit 58. Alternatively, a release command may be transmitted as the "stop unit command". In this case, the release command being in an OFF state indicates that the "stop unit command" is a "stop command" commanding the stop unit 58 to perform the stop drive; and the release command being in an ON state indicates that the "stop unit command" is a "release command" commanding the stop unit 58 to release the stop drive.

In the fifth embodiment, the power feeding command D is transmitted as the "power-feeding switch command" for the power feeding switch 72. Alternatively, a cutoff command may be transmitted as the "power-feeding switch command". In this case, the cutoff command being in an OFF state indicates that the "power-feeding switch command" is a "power feeding command"; and the cutoff command being in an ON state indicates that the "power-feeding switch command" is a "cutoff command".

In the fifth embodiment, the output signal β is transmitted as the "power-feeding state signal" indicating whether the predetermined voltage is outputted from the third electric power feeding path 71. Alternatively, a non-output signal may be transmitted as the "power-feeding state signal". In this case, the non-output signal being in an OFF state indicates an output state where the predetermined voltage is outputted from the third electric power feeding path 71; and the non-output signal being in an ON state indicates a non-output state where no voltage is outputted from the third electric power feeding path 71.

In the above-described embodiments, for each of the commands and the signals, the ON state of the command or signal is represented by the voltage level of the command or signal being a "High" level; and the OFF state of the command or signal is represented by the voltage level of the command or signal being a "Low" level. Alternatively, for each of the commands and the signals, the ON state of the command or signal may be represented by the voltage level of the command or signal repeating a "High" level and a "Low" level alternately. That is, the ON state of the command or signal may be represented by a pulse.

In the above-described embodiments, the power supply control is performed at each of the timings where the main power supply switch of the vehicle is turned from ON to OFF. Alternatively, the power supply control and the signal diagnosis X1 may be separately performed at the timings where the main power supply switch of the vehicle is turned from ON to OFF; and the timings where the power supply control is performed alternate with the timings where the signal diagnosis X1 is performed.

In the third to the fifth embodiments, in the power supply control, the signal diagnosis X2 is performed prior to the power supply switch diagnosis X3. Alternatively, the signal diagnosis X2 may be performed after the power supply switch diagnosis X3. In this case, the signal diagnosis X2 may be performed on condition that the power supply switch 52 is provisionally diagnosed as being abnormal in the power supply switch diagnosis X3. Further, if the activation signal α cannot be diagnosed as being normal in the signal diagnosis X2, the power supply switch 52 may not be diagnosed as being abnormal in the next execution of the power supply switch diagnosis X3.

In the fourth embodiment, the voltage drop waiting time Vw is set to 100 ms. However, the voltage drop waiting time Vw may be arbitrarily changed. Considering the estimated minimum time for the response (i.e., the voltage drop), it is preferable to set the voltage drop waiting time Vw to be longer than or equal to 1 ms. Moreover, considering the estimated maximum time for the response, it is more preferable to set the voltage drop waiting time Vw to be longer than or equal to 30 ms. Furthermore, considering other uncertain factors as well, it is further preferable to set the voltage drop waiting time Vw to be longer than or equal to 100 ms. On the other hand, to allow the power supply switch diagnosis X3 to be quickly performed, it is preferable to set the voltage drop waiting time Vw to be not excessively long (e.g., not longer than 1000 ms).

Moreover, in the fourth embodiment, the activation waiting time Aw is set to 50 ms. However, the activation waiting time Aw may be arbitrarily changed. Considering the estimated minimum time for the response (i.e., the activation of the first controller 57), it is preferable to set the activation waiting time Aw to be longer than or equal to 1 ms. Moreover, considering the estimated maximum time for the response, it is more preferable to set the activation waiting time Aw to be longer than or equal to 20 ms. Furthermore, considering other uncertain factors as well, it is further preferable to set the activation waiting time Aw to be longer than or equal to 50 ms. On the other hand, to allow the power supply switch diagnosis X3 to be quickly performed, it is preferable to set the activation waiting time Aw to be not excessively long (e.g., not longer than 1000 ms).

While the present disclosure has been described pursuant to the embodiments, it should be appreciated that the present disclosure is not limited to the embodiments. Instead, the present disclosure encompasses various modifications and changes within equivalent ranges. In addition, various combinations and modes are also included in the category and the scope of technical idea of the present disclosure.

What is claimed is:

1. An electronic control apparatus comprising:
a first controller for controlling a predetermined electronic device installed in a vehicle, the first controller being configured to be activated, upon being fed with electric power through a first electric power feeding path, and thus brought into an activated state; and
a second controller configured to be fed with electric power through a second electric power feeding path that is different from the first electric power feeding path,
wherein
in the first electric power feeding path, there is provided a power supply switch,
the power supply switch is configured to:
be turned on, when a predetermined switch command for the power supply switch is a connection command, and thereby enable the first electric power feeding path to transmit electric power; and
be turned off, when the switch command is a cutoff command, and thereby disable the first electric power feeding path from transmitting electric power,
the first controller is further configured to transmit a state signal indicating whether the first controller is in the activated state or a stopped state where the activation thereof is stopped,
the second controller is further configured to perform at least one of a stuck-OFF diagnosis and a stuck-ON diagnosis for the power supply switch,
in the stuck-OFF diagnosis, the second controller diagnoses, on condition that the state signal indicates the stopped state of the first controller when the switch command is the connection command, the power supply switch as being abnormal, and
in the stuck-ON diagnosis, the second controller diagnoses, on condition that the state signal indicates the activated state of the first controller when the switch command is the cutoff command, the power supply switch as being abnormal,
wherein
the electronic control apparatus further comprises, apart from the power supply switch, a stop unit capable of stopping the activation of the first controller,
the second controller is configured to perform at least the stuck-ON diagnosis, and
in a main power supply OFF state where a main power supply switch of the vehicle is kept OFF, the second controller causes, on condition that the power supply switch is diagnosed as being abnormal, the stop unit to stop the activation of the first controller.

2. The electronic control apparatus as set forth in claim 1, further comprising a third electric power feeding path through which electric power is fed to a predetermined part of the first controller,
wherein
in the third electric power feeding path, there is provided a power feeding switch,
the second controller is configured to:
diagnose, when a predetermined condition is satisfied, the power feeding switch as having a stuck-ON fault; and
perform, only upon diagnosing the power feeding switch as having no stuck-ON fault, the at least one of the stuck-OFF diagnosis and the stuck-ON diagnosis for the power supply switch.

3. The electronic control apparatus as set forth in claim 2, wherein
the power feeding switch is configured to:
be turned on, when a predetermined power-feeding switch command for the power feeding switch is a power feeding command, to enable the third electric power feeding path to transmit electric power; and be turned off, when the power-feeding switch command is a cutoff command, to disable the third electric power feeding path from transmitting electric power, the electronic control apparatus further comprises a signal transmitter, the signal transmitter is configured to transmit a power-feeding state signal indicating either an output state where a predetermined voltage is outputted from the third electric power feeding path or a non-output state where no voltage is outputted from the third electric power feeding path, and the second controller is configured to diagnose, on condition that the power-feeding state signal indicates the output state when the power-feeding switch command is the cutoff command, the power feeding switch as having the stuck-ON fault.

4. The electronic control apparatus as set forth in claim 1, wherein in the vehicle, there is installed an assembled battery that is constituted of a plurality of battery cells connected in series with each other, the plurality of battery cells are divided into a plurality of battery cell groups, the predetermined electronic control apparatus comprises a plurality of monitors each of which is provided for a corresponding one of the battery cell groups, each of the monitors is configured to transmit cell voltage information, which is information on voltages of the battery cells of the corresponding battery cell group, to the first controller, the second controller is configured to start performing the at least one of the stuck-OFF diagnosis and the stuck-ON diagnosis at a preset diagnosis start timing, and the diagnosis start timing is a timing at which activation of the vehicle is stopped and which is after the first controller has finished storing the cell voltage information in a predetermined nonvolatile memory.

5. The electronic control apparatus as set forth in claim 1, wherein in the vehicle, there is installed an assembled battery that is constituted of a plurality of battery cells connected in series with each other, the plurality of battery cells are divided into a plurality of battery cell groups, the predetermined electronic control apparatus comprises a plurality of monitors each of which is provided for a corresponding one of the battery cell groups, each of the monitors is configured to start, in response to an equalization command transmitted from the first controller, performing an equalization process of equalizing voltages of the battery cells of the corresponding battery cell group, the second controller is configured to start performing the at least one of the stuck-OFF diagnosis and the stuck-ON diagnosis at a preset diagnosis start timing, and the diagnosis start timing is a timing at which activation of the vehicle is stopped and which is after the first controller has finished transmitting the equalization command to the monitors.

6. The electronic control apparatus as set forth in claim 5, wherein the diagnosis start timing is a timing before the equalization process is completed by the monitors, and the second controller is configured to perform the at least one of the stuck-OFF diagnosis and the stuck-ON diagnosis in parallel with execution of the equalization process by the monitors.

7. An electronic control apparatus comprising:

a first controller for controlling a predetermined electronic device installed in a vehicle, the first controller being configured to be activated, upon being fed with electric power through a first electric power feeding path, and thus brought into an activated state; and a second controller configured to be fed with electric power through a second electric power feeding path that is different from the first electric power feeding path, wherein in the first electric power feeding path, there is provided a power supply switch, the power supply switch is configured to:

be turned on, when a predetermined switch command for the power supply switch is a connection command, and thereby enable the first electric power feeding path to transmit electric power; and be turned off, when the switch command is a cutoff command, and thereby disable the first electric power feeding path from transmitting electric power, the first controller is further configured to transmit a state signal indicating whether the first controller is in the activated state or a stopped state where the activation thereof is stopped, the second controller is further configured to perform at least one of a stuck-OFF diagnosis and a stuck-ON diagnosis for the power supply switch, in the stuck-OFF diagnosis, the second controller diagnoses, on condition that the state signal indicates the stopped state of the first controller when the switch command is the connection command, the power supply switch as being abnormal, and in the stuck-ON diagnosis, the second controller diagnoses, on condition that the state signal indicates the activated state of the first controller when the switch command is the cutoff command, the power supply switch as being abnormal, wherein the second controller is configured to:

diagnose, when a predetermined signal normality condition is satisfied, the state signal as being normal; and perform, only upon diagnosing the state signal as being normal, the at least one of the stuck-OFF diagnosis and the stuck-ON diagnosis.

8. The electronic control apparatus as set forth in claim 7, further comprising, apart from the power supply switch, a stop unit capable of stopping the activation of the first controller, wherein the signal normality condition comprises a condition that the state signal indicates the activated state of the first controller when the switch command is the connection command and the activation of the first controller is not stopped by the stop unit.

9. The electronic control apparatus as set forth in claim 7, further comprising, apart from the power supply switch, a stop unit capable of stopping the activation of the first controller, wherein the signal normality condition comprises a condition that the state signal indicates the stopped state of the first controller when the switch command is the connection command and the activation of the first controller is stopped by the stop unit.

10. The electronic control apparatus as set forth in claim 7, further comprising a third electric power feeding path through which electric power is fed to a predetermined part of the first controller,
wherein
in the third electric power feeding path, there is provided a power feeding switch,
the second controller is configured to:
diagnose, when a predetermined condition is satisfied, the power feeding switch as having a stuck-ON fault; and
perform, only upon diagnosing the power feeding switch as having no stuck-ON fault, the at least one of the stuck-OFF diagnosis and the stuck-ON diagnosis for the power supply switch.

11. The electronic control apparatus as set forth in claim 10, wherein
the power feeding switch is configured to:
be turned on, when a predetermined power-feeding switch command for the power feeding switch is a power feeding command, to enable the third electric power feeding path to transmit electric power; and
be turned off, when the power-feeding switch command is a cutoff command, to disable the third electric power feeding path from transmitting electric power,
the electronic control apparatus further comprises a signal transmitter,
the signal transmitter is configured to transmit a power-feeding state signal indicating either an output state where a predetermined voltage is outputted from the third electric power feeding path or a non-output state where no voltage is outputted from the third electric power feeding path, and
the second controller is configured to diagnose, on condition that the power-feeding state signal indicates the output state when the power-feeding switch command is the cutoff command, the power feeding switch as having the stuck-ON fault.

12. The electronic control apparatus as set forth in claim 7, wherein
in the vehicle, there is installed an assembled battery that is constituted of a plurality of battery cells connected in series with each other,
the plurality of battery cells are divided into a plurality of battery cell groups,
the predetermined electronic control apparatus comprises a plurality of monitors each of which is provided for a corresponding one of the battery cell groups,
each of the monitors is configured to transmit cell voltage information, which is information on voltages of the battery cells of the corresponding battery cell group, to the first controller,
the second controller is configured to start performing the at least one of the stuck-OFF diagnosis and the stuck-ON diagnosis at a preset diagnosis start timing, and
the diagnosis start timing is a timing at which activation of the vehicle is stopped and which is after the first controller has finished storing the cell voltage information in a predetermined nonvolatile memory.

13. The electronic control apparatus as set forth in claim 7, wherein
in the vehicle, there is installed an assembled battery that is constituted of a plurality of battery cells connected in series with each other,
the plurality of battery cells are divided into a plurality of battery cell groups,
the predetermined electronic control apparatus comprises a plurality of monitors each of which is provided for a corresponding one of the battery cell groups,
each of the monitors is configured to start, in response to an equalization command transmitted from the first controller, performing an equalization process of equalizing voltages of the battery cells of the corresponding battery cell group,
the second controller is configured to start performing the at least one of the stuck-OFF diagnosis and the stuck-ON diagnosis at a preset diagnosis start timing, and
the diagnosis start timing is a timing at which activation of the vehicle is stopped and which is after the first controller has finished transmitting the equalization command to the monitors.

14. The electronic control apparatus as set forth in claim 13, wherein
the diagnosis start timing is a timing before the equalization process is completed by the monitors, and
the second controller is configured to perform the at least one of the stuck-OFF diagnosis and the stuck-ON diagnosis in parallel with execution of the equalization process by the monitors.

15. An electronic control apparatus comprising:
a first controller for controlling a predetermined electronic device installed in a vehicle, the first controller being configured to be activated, upon being fed with electric power through a first electric power feeding path, and thus brought into an activated state; and
a second controller configured to be fed with electric power through a second electric power feeding path that is different from the first electric power feeding path,
wherein
in the first electric power feeding path, there is provided a power supply switch,
the power supply switch is configured to:
be turned on, when a predetermined switch command for the power supply switch is a connection command, and thereby enable the first electric power feeding path to transmit electric power; and
be turned off, when the switch command is a cutoff command, and thereby disable the first electric power feeding path from transmitting electric power,
the first controller is further configured to transmit a state signal indicating whether the first controller is in the activated state or a stopped state where the activation thereof is stopped,
the second controller is further configured to perform at least one of a stuck-OFF diagnosis and a stuck-ON diagnosis for the power supply switch,
in the stuck-OFF diagnosis, the second controller diagnoses, on condition that the state signal indicates the stopped state of the first controller when the switch command is the connection command, the power supply switch as being abnormal, and
in the stuck-ON diagnosis, the second controller diagnoses, on condition that the state signal indicates the activated state of the first controller when the switch command is the cutoff command, the power supply switch as being abnormal,
wherein
the electronic control apparatus further comprises, apart from the power supply switch, a stop unit capable of stopping the activation of the first controller,
the second controller is configured to perform at least the stuck-ON diagnosis, the second controller is further configured to:
stop the activation of the first controller by the stop unit;
set the switch command to the cutoff command; and
release, after a predetermined first time has elapsed from the setting of the switch command to the cutoff command, the stopping of the activation of the first controller by the stop unit, and
the second controller is further configured to diagnose, on condition that the state signal indicates the activated state of the first controller before a predetermined second time has elapsed from the release of the stopping of the activation of the first controller by the stop unit, the power supply switch as being abnormal.

16. The electronic control apparatus as set forth in claim 15, wherein
the first time is predetermined to be longer than or equal to a time from the setting of the switch command to the cutoff command until the first controller becomes no longer activated even if the stopping of the activation of the first controller by the stop unit is released in the case of the power supply switch having no stuck-ON fault.

17. The electronic control apparatus as set forth in claim 15, wherein
the second time is predetermined to be longer than or equal to a time from the release of the stopping of the activation of the first controller by the stop unit until the state signal becomes indicative of the activated state of the first controller in the case of the power supply switch having a stuck-ON fault.

18. The electronic control apparatus as set forth in claim 15, wherein
the second controller is configured to diagnose, on condition that a series of operations have been repeated a plurality of times in the state of the switch command being the cutoff command, the power supply switch as being abnormal, and
the series of operations include:
releasing, in a state where the activation of the first controller is stopped by the stop unit, the stopping of the activation of the first controller by the stop unit; and then
having the state signal become indicative of the activated state of the first controller.

19. The electronic control apparatus as set forth in claim 15, further comprising a third electric power feeding path through which electric power is fed to a predetermined part of the first controller,
wherein
in the third electric power feeding path, there is provided a power feeding switch,
the second controller is configured to:
diagnose, when a predetermined condition is satisfied, the power feeding switch as having a stuck-ON fault; and
perform, only upon diagnosing the power feeding switch as having no stuck-ON fault, the at least one of the stuck-OFF diagnosis and the stuck-ON diagnosis for the power supply switch.

20. The electronic control apparatus as set forth in claim 19, wherein
the power feeding switch is configured to:
be turned on, when a predetermined power-feeding switch command for the power feeding switch is a power feeding command, to enable the third electric power feeding path to transmit electric power; and
be turned off, when the power-feeding switch command is a cutoff command, to disable the third electric power feeding path from transmitting electric power, the electronic control apparatus further comprises a signal transmitter,
the signal transmitter is configured to transmit a power-feeding state signal indicating either an output state where a predetermined voltage is outputted from the third electric power feeding path or a non-output state where no voltage is outputted from the third electric power feeding path, and
the second controller is configured to diagnose, on condition that the power-feeding state signal indicates the output state when the power-feeding switch command is the cutoff command, the power feeding switch as having the stuck-ON fault.

21. The electronic control apparatus as set forth in claim 15, wherein
in the vehicle, there is installed an assembled battery that is constituted of a plurality of battery cells connected in series with each other,
the plurality of battery cells are divided into a plurality of battery cell groups,
the predetermined electronic control apparatus comprises a plurality of monitors each of which is provided for a corresponding one of the battery cell groups,
each of the monitors is configured to transmit cell voltage information, which is information on voltages of the battery cells of the corresponding battery cell group, to the first controller,
the second controller is configured to start performing the at least one of the stuck-OFF diagnosis and the stuck-ON diagnosis at a preset diagnosis start timing, and
the diagnosis start timing is a timing at which activation of the vehicle is stopped and which is after the first controller has finished storing the cell voltage information in a predetermined nonvolatile memory.

22. The electronic control apparatus as set forth in claim 15, wherein
in the vehicle, there is installed an assembled battery that is constituted of a plurality of battery cells connected in series with each other,
the plurality of battery cells are divided into a plurality of battery cell groups,
the predetermined electronic control apparatus comprises a plurality of monitors each of which is provided for a corresponding one of the battery cell groups,
each of the monitors is configured to start, in response to an equalization command transmitted from the first controller, performing an equalization process of equalizing voltages of the battery cells of the corresponding battery cell group,
the second controller is configured to start performing the at least one of the stuck-OFF diagnosis and the stuck-ON diagnosis at a preset diagnosis start timing, and
the diagnosis start timing is a timing at which activation of the vehicle is stopped and which is after the first controller has finished transmitting the equalization command to the monitors.

23. The electronic control apparatus as set forth in claim 22, wherein
the diagnosis start timing is a timing before the equalization process is completed by the monitors, and
the second controller is configured to perform the at least one of the stuck-OFF diagnosis and the stuck-ON diagnosis in parallel with execution of the equalization process by the monitors.

24. An electronic control apparatus comprising:
a first controller for controlling a predetermined electronic device installed in a vehicle, the first controller being configured to be activated, upon being fed with electric power through a first electric power feeding path, and thus brought into an activated state; and a second controller configured to be fed with electric power through a second electric power feeding path that is different from the first electric power feeding path, wherein in the first electric power feeding path, there is provided a power supply switch, the power supply switch is configured to:

be turned on, when a predetermined switch command for the power supply switch is a connection command, and thereby enable the first electric power feeding path to transmit electric power; and be turned off, when the switch command is a cutoff command, and thereby disable the first electric power feeding path from transmitting electric power, the first controller is further configured to transmit a state signal indicating whether the first controller is in the activated state or a stopped state where the activation thereof is stopped, the second controller is further configured to perform at least one of a stuck-OFF diagnosis and a stuck-ON diagnosis for the power supply switch, in the stuck-OFF diagnosis, the second controller diagnoses, on condition that the state signal indicates the stopped state of the first controller when the switch command is the connection command, the power supply switch as being abnormal, and in the stuck-ON diagnosis, the second controller diagnoses, on condition that the state signal indicates the activated state of the first controller when the switch command is the cutoff command, the power supply switch as being abnormal, wherein the electronic control apparatus further comprises:

apart from the power supply switch, a stop unit capable of stopping the activation of the first controller; and a third electric power feeding path through which electric power is fed to a predetermined part of the first controller, in the third electric power feeding path, there is provided a power feeding switch, the second controller is configured to:

diagnose, when a predetermined condition is satisfied, the power feeding switch as having a stuck-ON fault; and perform, upon diagnosing the power feeding switch as having the stuck-ON fault, a power-feeding switch abnormality handling of keeping the switch command as the connection command and stopping the activation of the first controller by the stop unit in a main power supply OFF state where a main power supply switch of the vehicle is kept OFF.

25. The electronic control apparatus as set forth in claim 24, wherein the power feeding switch is configured to:

be turned on, when a predetermined power-feeding switch command for the power feeding switch is a power feeding command, to enable the third electric power feeding path to transmit electric power; and be turned off, when the power-feeding switch command is a cutoff command, to disable the third electric power feeding path from transmitting electric power, the electronic control apparatus further comprises a signal transmitter, the signal transmitter is configured to transmit a power-feeding state signal indicating either an output state where a predetermined voltage is outputted from the third electric power feeding path or a non-output state where no voltage is outputted from the third electric power feeding path, and the second controller is configured to diagnose, on condition that the power-feeding state signal indicates the output state when the power-feeding switch command is the cutoff command, the power feeding switch as having the stuck-ON fault.

26. The electronic control apparatus as set forth in claim 24, wherein in the vehicle, there is installed an assembled battery that is constituted of a plurality of battery cells connected in series with each other, the plurality of battery cells are divided into a plurality of battery cell groups, the predetermined electronic control apparatus comprises a plurality of monitors each of which is provided for a corresponding one of the battery cell groups, each of the monitors is configured to transmit cell voltage information, which is information on voltages of the battery cells of the corresponding battery cell group, to the first controller, the second controller is configured to start performing the at least one of the stuck-OFF diagnosis and the stuck-ON diagnosis at a preset diagnosis start timing, and the diagnosis start timing is a timing at which activation of the vehicle is stopped and which is after the first controller has finished storing the cell voltage information in a predetermined nonvolatile memory.

27. The electronic control apparatus as set forth in claim 24, wherein in the vehicle, there is installed an assembled battery that is constituted of a plurality of battery cells connected in series with each other, the plurality of battery cells are divided into a plurality of battery cell groups, the predetermined electronic control apparatus comprises a plurality of monitors each of which is provided for a corresponding one of the battery cell groups, each of the monitors is configured to start, in response to an equalization command transmitted from the first controller, performing an equalization process of equalizing voltages of the battery cells of the corresponding battery cell group, the second controller is configured to start performing the at least one of the stuck-OFF diagnosis and the stuck-ON diagnosis at a preset diagnosis start timing, and the diagnosis start timing is a timing at which activation of the vehicle is stopped and which is after the first controller has finished transmitting the equalization command to the monitors.

28. The electronic control apparatus as set forth in claim 27, wherein the diagnosis start timing is a timing before the equalization process is completed by the monitors, and the second controller is configured to perform the at least one of the stuck-OFF diagnosis and the stuck-ON diagnosis in parallel with execution of the equalization process by the monitors.

* * * * *